United States Patent [19]

Flanders et al.

[11] 4,337,893
[45] Jul. 6, 1982

[54] MULTI-PHASE MODULAR COMFORT CONTROLLED HEATING SYSTEM

[75] Inventors: Staunton O. Flanders, Highland Park; William A. Ness, Kildeer, both of Ill.

[73] Assignee: Energy Savings Parhelion, Northbrook, Ill.

[21] Appl. No.: 208,509

[22] Filed: Nov. 20, 1980

Related U.S. Application Data

[63] Continuation-in-part of Ser. No. 137,737, Apr. 7, 1980, abandoned, which is a continuation-in-part of Ser. No. 104,191, Dec. 17, 1979, abandoned.

[51] Int. Cl.³ .......................... F24H 3/06; F24D 5/18
[52] U.S. Cl. ...................................... 237/7; 236/1 EB; 236/10
[58] Field of Search ............... 236/1 EB, 46 R, 10, 236/21 B, 25; 126/101, 350 R; 237/8 R, 17, 7

[56] References Cited

U.S. PATENT DOCUMENTS

| | | | |
|---|---|---|---|
| 1,237,403 | 8/1917 | Stack | 236/1 EB |
| 1,414,361 | 5/1922 | Hutchins et al. | 126/350 R |
| 2,083,612 | 6/1937 | Midyette, Jr. | 236/1 EB |
| 2,249,554 | 7/1941 | Daly | 126/101 |
| 3,714,980 | 2/1973 | Lancia et al. | 165/26 |
| 4,071,745 | 1/1978 | Hall | 236/46 R X |

Primary Examiner—William E. Wayner
Attorney, Agent, or Firm—Dressler, Goldsmith, Shore, Sutker & Milnamow, Ltd.

[57] ABSTRACT

A circulating fluid that is heated by a number of gas-fired burner assemblies is used to heat a space either through a hot water system or a forced air heating system. Each burner assembly includes a housing with a heat exchanger mounted therein and a gas burner for heating the fluid which flows through the heat exchanger. The heat exchangers are connected in parallel in a closed loop forced circulation system. A microprocessor based thermostat control compares the temperature in the space heated by the air with a reference temperature. Dependent upon the magnitude of the difference between the temperatures, one or more of the burner assemblies are energized. The burner assemblies are sized such that during most of the heating season only a fraction of the burner assemblies are used. Burner assemblies are cycled on and off as needed to return the temperature to the steady state during the warmer and colder parts of the heating season at least one burner assembly is usually in operation during a majority of the heating season.

31 Claims, 12 Drawing Figures

DEGREES F INSIDE/OUTSIDE T/D

MULTI-PHASE MODULAR COMFORT CONTROLLED HEATING SYSTEM

CROSS REFERENCE TO RELATED APPLICATION

This application is a Continuation in Part of pending U.S. application Ser. No. 137,737 filed on Apr. 7, 1980, now abandoned, which was a continuation in part of U.S. patent application Ser. No. 104,191 originally filed on Dec. 17, 1979 and since abandoned.

TECHNICAL FIELD

This invention relates generally to heating systems and more particularly concerns a unique forced circulation high efficiency heating system with an automatic control scheme which maximizes comfort and minimizes wasted fuel.

BACKGROUND OF THE INVENTION

It is common to heat fluids by the forced circulation of fluid through a heat exchanger which is in the combustion chamber of a furnace. Typically, the heat exchanger is in contact with the hot combustion gases emitted from one or more burners.

Normally, the housing defining the combustion chamber provides a relatively large heat conductive surface area exposed to the heated combustion gases. However, only a fraction of this surface area includes the heat exchanger. Thus, there usually are significant heat losses from the combustion chamber housing. Moreover, the efficiency of heat transfer to the fluid to be heated and the temperature of the combustion gases in the vicinity of the heat exchanger is reduced because of the relatively large volume and mass of air in the combustion chamber. The rate of heat transfer in such a system is determined, for a given heat exchanger, by the temperature differential between the fluid being heated and the hot combustion gases. The temperature increase of the fluid flowing through the heat exchanger is also dependent upon the rate of flow of the fluid through the heat exchanger.

Existing furnaces and heating boilers are typically designed and rated at a steady state combustion efficiency of approximately 80% (i.e. percent of energy available for heating due to the burning of fuel). The utilization efficiency or overall efficiency of these units is usually less than 80% under steady state firing conditions.

A change in ambient temperature of only a few degrees can be sensed by the human body. This is exactly what occurs when ordinary heating systems cycle on and off in an effort to maintain an average temperature in the heated space. The thermometers on ordinary thermostats are slow acting and have a tendency to display the "average temperature" of the space or room being monitored. It is common experience to experience a "chill" only to find that the thermostat displays the selected set point temperature (e.g. 70° F.). In fact, if the thermostat could read the actual room temperature, it would be something less (e.g. 68° F. or below). Due to the cycling of the heating system, this chilling sensation often occurs many times each hour.

Another problem is the household "juggler." This is the person who turns the thermostat up or down depending on how he or she feels at the moment. If the juggler is a little chilly, up goes the thermostat. If the juggler is too warm, either the thermostat is turned back down, or worse yet, the window is opened! Every time the heating system comes on and the room becomes warm, the juggler becomes "hot" and decides to lower the temperature. Then the heating system shuts off and the ducts, the furnace, and the flue which are hot, rapidly cool off and waste their heat. Now the juggler feels cold and turns up the thermostat. When the system comes on, part of the heat energy is "wasted" in heating up these components again. These losses are often called "startup losses". It represents lost efficiency in that the heat is not used to keep the room warm. Startup losses have considerable effect on ones annual heating bill.

Thus, it is not so much a lower temperature that causes discomfort as it is the frequent and rapid temperature swings (e.g. about 3° F. to 4° F. up and down) such as occurs during the cycling of the heating system. Since heating plants or units are oversized for a vast majority of the heating season in most geographic locations, such furnaces have excess "standby capacity."

The standby capacity results from the fact that furnaces are typically sized to be effective during times of maximum design heat loss for a given geographic area. For example, Chicago, Ill. is rated at −10° F. outdoor temperature and a 70° F. indoor temperature—an 80° F. temperature difference (T/D). However, such severe conditions are experienced for as little as 1% of the total heating season. Therefore, even assuming that the furnace is not oversized, it is evident that a steady state firing condition is achieved for less than 1% of the entire heating season. In other words, for 99% of the "normal" heating season in Chicago these heating units must cycle on and off to maintain the heated space (e.g. the interior of a building or dwelling) at a comfortable temperature.

Thus, at moderate temperature differentials (i.e., less than design value of 80° F. in Chicago) between the inside and the outside air temperatures, the furnace raises the temperature from a low to high temperature faster than the ambient temperature of the room cools from the same high to low temperature. As the outdoor temperature moderates, the amount of standby capacity increases and the rapidity of low to high temperature swings increases. At colder outdoor temperatures the process is reversed and the rate of heating from a low to high temperature is slower than the rate of cooling from a high to a low temperature.

There is still another problem. During these on and off cycles a certain amount of heat is lost due to "reverse heat transfer." That is, when the furnace burner is off and the combustion chamber is hot, a "stack effect" takes place. Due to the relative difference in density between warm and cold air, air from the interior of the combustion chamber flows up the flue cooling the fluid (e.g., air) in the heat exchanger. These convective heat or energy losses are often referred to as "standby losses." Stand-by losses are accentuated by the conventional method of sizing furnaces and heating plants for the worst part of the heating season. Since steady state conditions do not exist for any appreciable length of time, (except maybe for the small percentage of the heating season when temperature differentials are equal to or greater than design conditions), standby and startup losses occur every time the heating plant is cycled on and off. Thus, as long as the furnace cycles, startup losses will occur at the beginning of each cycle and standby losses will occur at the end of each cycle.

From the foregoing it should be clear that the majority of existing furnaces are oversized. For example, if a home has a estimated heat loss of 80,000 BTU/hr. at design conditions, it is highly unlikely that a heating unit rated at 100,000 BTU/hr. input and 80,000 BTU/hr. output (80% combustion efficiency) will be used. More likely than not a larger unit, e.g., one rated at 120,000 BTU/hr. input and 96,000 BTU/hr. output or 125,000 BTU/hr. input and 100,000 BTU/hr. output, will be used. Most home heating units are produced with input ratings that differ by approximately 20,000 BTU/hr. with an input rating of at least 80,000 BTU/hr., (e.g., 100,000 BTU/hr., 120,000 BTU/hr., etc.). In other words, it is likely that the heating unit will be oversized by at least 20% to 25%. In some cases even larger units are used to be sure there is enough contingent capacity. Thus, in practice, heating plants in some buildings are oversized by at least 50%!

Currently, the most prominent method pursued for fuel savings is the "night setback" thermostat where the room temperature is reduced at least one time during the 24-hour day (i.e. usually at night or when the house is unoccupied during the day) by about 8° to 10° F. In order to achieve recovery from these setbacks, additional burner capacity of 20% to 25% must be used and must be available for use. It can be understood that if improperly sized, a conventional unit would not have the capacity to recover from a temperature lower than the outdoor design temperatures. For example, a properly sized unit having a 8° to 10° F. setback and a two hour recovery time, will only be efficient at one particular outdoor temperature. Thus, recovery will be faster at higher temperatures and slower at lower temperatures. Significantly, the recovery capability is completely gone as the outdoor temperature approaches its design temperatures.

One approach in attempting to offset resulting "excess capacity" inefficiencies is to use heating units that have high and low firing rates. These units effectively are based on two design conditions (e.g., 80° F. rise and 40° F. rise). However, it is common knowledge among those skilled in the art that a burner has the greatest combustion efficiency at only one firing rate. Thus, if the burner is efficient at the high firing rate, it will not be as efficient at a low firing rate. Consequently, modulating or varying the firing rate is not a complete answer to the excess capacity problem.

Some have proposed to reduce standby heat losses by restricting the flow of warm air from the combustion chamber through the chimney. However, because draft affects the burning of the air and gas mixture in the burner, what might be gained by reducing standby losses is often lost by lower combustion efficiency.

It is well known that if a heating plant could be designed for 90% combustion efficiency, fuel consumption could be reduced by approximately 12 percent. However, for large residential burners, attempts to obtain anything greater than 80% combustion efficiency has resulted in incomplete combustion and corrosive moisture condensing in the flue. Even then the seasonal oversizing losses and the discomfort experienced by periodic high to low temperatures cycling would still exist. Thus, merely improving the efficiency of the burner or reducing standby losses are only partial measures to reduce wasted energy.

Few have recognized the wasteful practice of sizing furnaces for the worst set of design conditions anticipated and operating that furnace cyclically throughout the heating season. Geaslen U.S. Pat. No. 3,329,343 describes a heating system that uses a plurality of large water heaters or boilers connected in parallel to supply hot water for heating. Each of the boilers is actuated one at a time in direct response to the outdoor temperature. Each boiler has its own individual circulating pump and a set of inlet and outlet isolation valves. When the outdoor temperature decreases to a preselected value, the valves are opened, the pump is started and the boiler is placed in operation. Thus, the water stored within the individual standby boilers is not heated until it is needed. The boilers are shut off in response to the temperature of the circulating water exceeding a preselected set point.

Thus "room temperature", as such, does not cause the heating system to cycle. It should be clear that once the additional heat from the hot water is needed, it will take an appreciable amount of time to heat the mass of stagnant ambient water and for the heating system as a whole to have any effect. Such a heating system is inherently inefficient and wasteful because of the large mass of fluid that is stored at ambient temperature and because water has a high specific heat capacity.

Moreover, mixing the cold stagnant water with the already heated circulating warm water actually decreases the overall temperature of the water being circulated. Furthermore, start-up losses start out high and remain high until the bulk of water in the boiler is raised to the temperature required to maintain the room or the building warm. In addition, Geaslen's use of boilers, with the time required to heat the stored mass of cold water, would appear to preclude quick response and uniform temperature control.

Thus, while Geaslen shows some understanding of the problem of excess standby capacity, he has not really addressed or solved the problems of start-up losses and the maintainance of uniform room temperature while boilers are cycled on and off.

Van Vliet U.S. Pat. No. 3,935,855, describes a gas fired warm air furnace incorporating a plurality of flanking heat exchangers which are individually fired and across which a blower circulates air. In other words, a separate burner is provided for each heat exchanger and the heat exchangers are situated adjacent to one another and transversely to the flow of air being heated. Thus, air flows across all of the heat exchangers whether or not the corresponding gas burner is in operation. The gas burners themselves are fired automatically using a multistage thermostat. Since in this arrangement air is always circulated sequentially through and across all of the heat exchangers, this arrangement does not reduce standby losses from those heat exchangers where the gas burner is not being fired. This is because the temperature difference between the ambient and the circulating air is at a relatively high value. As a result, a percentage of the heat energy produced in the upstream burners "goes up the stack" in the idle downstream heat exchangers due to reverse heat transfer. Additional modules referred to in the patent will only increase such losses.

In spite of the apparent differences between the two patents, they are similar in that both provide for sequential heating of the medium being heated; both, while recognizing the problem of excess standby capacity, do no disclose an effective heating system to minimize start-up losses and standby losses; and neither patent discloses a system capable of maintaining the temperature of the space being heated generally uniform within a very narrow band.

What is needed is an innovative approach to heating system design that reduces start-up losses and standby losses, improves burner efficiency and substantially eliminates the wasteful effects of excess standby capacity.

SUMMARY OF THE INVENTION

In accordance with the present invention there is provided an improved highly efficient heating system which is capable of operating at steady state to maintain the temperature of the space being heated substantially constant at selected values over a wide range of ambient conditions, while at the same time utilizing a relatively high percentage of the heat released by the fuel, thereby reducing the overall consumption of the fuel and maximizing the comfort of occupants of the heated space.

The heating system of the present invention is an improved, high efficiency heating system that overcomes the disadvantages of existing heating plants by incorporating the following characteristics and capabilities:

(1) It is capable of steady state firing for a plurality of design conditions (i.e. variable outdoor to indoor temperature differences).

(2) It attains better than 80% combustion efficiency.

(3) Its combustion chamber or burner assembly has a small volume to minimize residual heat storage that can be lost by the stack effect (e.g. standby losses).

(4) It is adaptable to existing heating systems (i.e. easily retrofitted).

(5) It minimizes temperature cycling allowing lower set points and greater comfort levels by achieving extended steady state conditions.

(6) It is not oversized yet is easily adapted to increase capacity.

(7) It achieves greatly reduced operating costs and fuel consumption by reducing periodic temperature cycling and the resultant standby losses.

(8) Startup losses are minimized since steady state conditions are achieved soon after additional burner assemblies are placed in operation.

(9) It has improved seasonal utilization efficiency, i.e. it is not sized for one (usually the worst case) specific set of design indoor and outdoor temperatures.

(10) It is economical to build and to use.

The heating system of the present invention is designed to operate at maximum efficiency over the wide range of temperatures experienced during a normal heating season. It uses a plurality compact, incrementally sized, individually controlled and fired burner assemblies, adaptable for use in conjunction with state-of-the-art precision control systems.

The system of the present invention is capable of using its total capacity to bring the interior of a building to a desired temperature and then phases to an operating mode where only a fraction of that total capacity is used to maintain the desired temperature. By using a plurality of individually fired and controlled small incremental burners to transfer heat to an enclosed space such that the heat loss (at any given outdoor temperature) is equal to the heat gain, the temperature of the dwelling is kept uniform and relatively constant. By minimizing periodic cycling of total burner capacity, which is what occurs in ordinary heating arrangements, startup, standby, and excessive flue losses are minimized.

The system of the present invention is particularly adaptable for use with a reliable and precise control, such as one which incorporates a microprocessor. In accordance with one aspect of the present invention, such a controller monitors both indoor and outdoor temperatures to anticipate the heating load changes and control the burner assemblies accordingly.

The system of the present invention is capable of limiting room temperature variations to less than $\pm \frac{1}{2}°$ F. or less, as compared to the usual 3° F. to 5° F. temperature swing found with ordinary heating systems. This feature alone adds greatly to the comfort of building occupants.

The present invention can be "oversized" for recovery without sacrificing efficiency, by using one or more modules in excess of design requirements. The present invention then has standby setback capacity that only fires during recovery times and remains off at all other times. The present invention incorporates a control system which dictates how many modules must be fired in order to maintain the same recovery time regardless of outdoor temperature.

Direct comparison testing has confirmed fuel savings of about 50%. Testing was conducted using an actual residential heating system with a name brand heating unit. In one series of these tests the system of the present invention showed an average efficiency of 1099 BTU per degree of temperature rise as opposed to an average efficiency of 1845 BTU per degree for the conventional heating unit. This represents a 40.5% fuel saving. By adding a day/night setback and outdoor temperature sensing controls, additional savings of 5.4% fuel savings can be realized for a total savings of almost 46%.

This level of efficiency has been achieved by eliminating energy wasting heat exchanger mass and effectively reducing heating plant size through use of modular, incrementally sized burner assemblies which minimize startup and standby losses. An American Gas Association (A.G.A.) approved fuel savings spark ignition pilot/burner control system can also be employed for additional fuel savings. By maintaining steady state operation, temperature levels are accurately maintained without the usual temperature variations due to conventional heating system cycling.

Conventional heating systems are characterized by heated room temperature swings of at least about plus or minus 2° F. This 4° F. temperature change occurs every furnace cycle and affects the personal comfort level of the occupants of the heated building. Conventional heating systems cycle on the average of three times per hour during most of the heating season. In contrast the present invention cycles approximately four times per day with maximum temperature change of 1° F.

As a result, thermostat setting of 5 degrees less than normal can be used while still maintaining adequate comfort. This is due in part to the less than a one degree temperature differential that is normally experienced. The ability to lower one's thermostat 5° F. while still maintaining the same or better comfort level accounts for an additional 3.8% fuel saving for a grand total of 49.7% or about 50%.

The heating system that is the subject of the present invention can make effective use of a control system based on modern microcomputer technology which:

(a) Senses both indoor and outdoor temperatures to anticipate changes in heating requirements.

(b) Can be easily programmed to control indoor temperatures at different set points throughout the day.

(c) Allows manual overriding of the preset time/temperature program.

(d) Results in indoor temperature variations of 1° F. or less.

(e) Has an air conditioning control capability.

The heating system of the present invention incorporates multiphased, modular, incrementally sized burner modules which are individually controlled and fired; uses, in the preferred embodiment, a high efficiency gas burner design with a combustion efficiency of at least about 84%; incorporates A.G.A. approved spark ignition pilot/burner control; is sized and configured for use with existing heating systems; has jacket losses less than 1%; and is adaptable to either forced air or hot water heating system.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION

Figure 1:
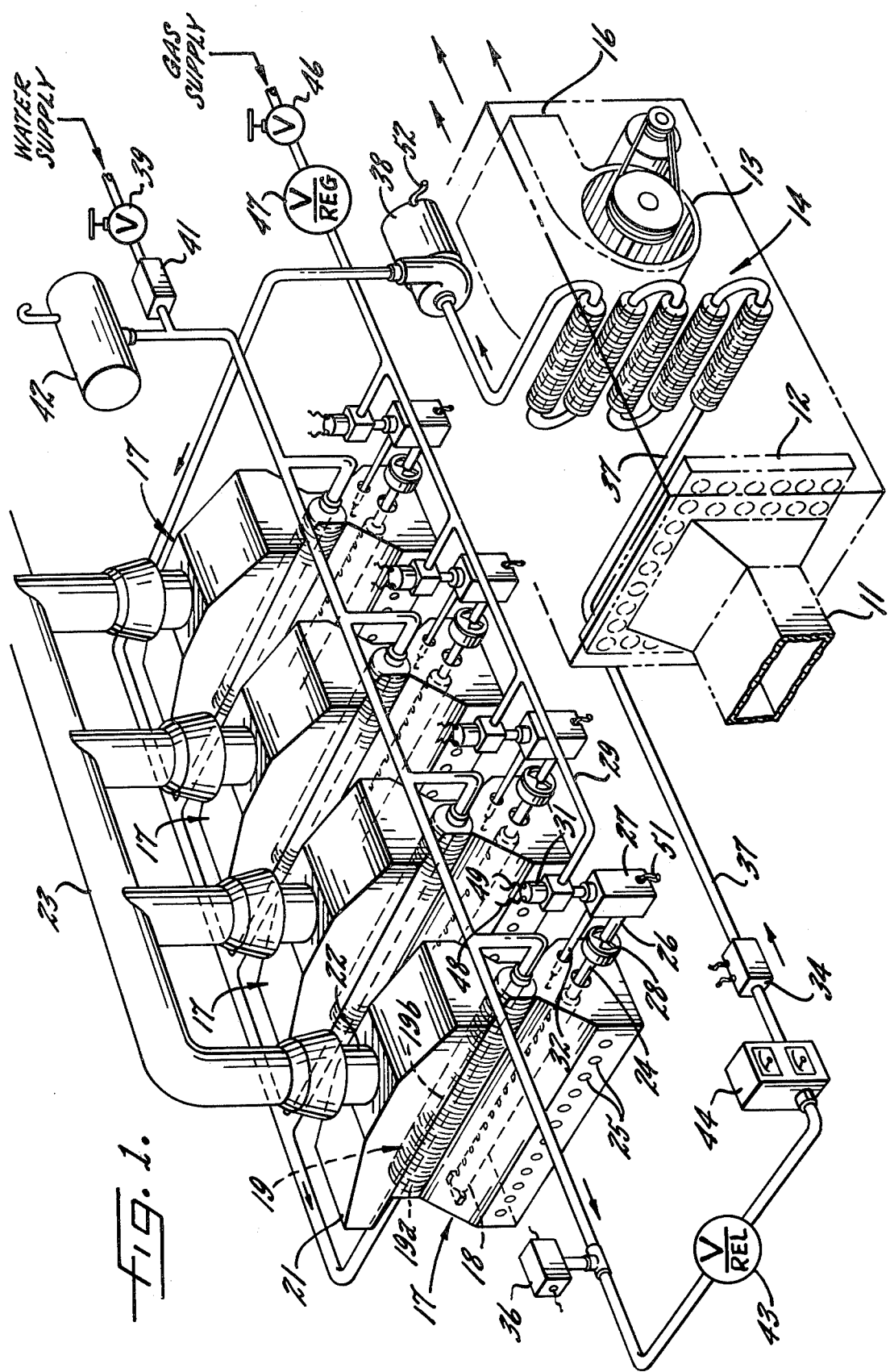
FIG. 1 is a diagrammatic perspective view of the burner assemblies, heat exchangers and the related forced circulation and gas flow systems of one embodiment of a furnace system incorporating the present invention.

While the invention is susceptible to various modifications and alternative forms, specific embodiments have been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention, as defined by the appended claims.

The principal components of one embodiment of a gas forced-air heating system incorporating the present invention are illustrated in FIG. 1. Although the invention will be described with particular reference to the forced-air system shown in the drawings, it will be apparent from the following discussion that the invention is equally applicable to hot water heating systems, etc.

For purposes of this discussion "startup losses" are defined as those heat losses which occur from the time the furnace or burner is placed in operation until a steady state condition is reached. On the other hand, "standby losses" are those heat losses from the furnace which occur from the time that the burner is shut down until the time that the burner is again placed in operation. These latter losses are primarily losses due to convective heat transfer and are generally localized in the area or section of the furnace into which the burners are inserted. In contrast, startup losses are generally distributed throughout the entire heating system since all of the components of the heating system must be brought up to temperature before a steady state firing condition can be reached.

MECHANICAL COMPONENTS

As is typical of forced air heating systems, the system of the present invention employs a blower, an air filter, and a heat exchanger. Air is drawn into a cold air return 11 through an air filter 12 and across a heat exchanger 14 by a blower 13. The filter, heat exchanger and blower are all contained in a common housing 16. The blower 13 forces the heated air through a hot air plenum to a heating duct network which discharges the heated air through inlet registers (not shown) into the space or enclosure being heated. Relatively cool air is drawn by the blower 13 through return registers in the space heated by the heating system. This cool air is then funneled through the cold air return 11 and the cycle is repeated.

In order to heat the air drawn across the heat exchanger 14 in the system of FIG. 1, a forced circulation system is used. Water is forced to circulate through a plurality of burner heat exchangers 19 joined together in a reverse parallel flow relationship. A corresponding plurality of modular burner assemblies 17 (four being shown in FIG. 1) is used to supply thermal energy to the heat exchanger. The water is circulated through all of the heat exchangers 14 and 19 by a pump 38. Gas burners are used because of the inherent energy efficiency and low fuel cost. It should be understood that any desired number N of burner assemblies 17 may be used, where N is two or more and together represent the maximum heat transfer capacity of the heating system.

Preferably the overall volume of the forced circulation system is as small as possible consistent with the layout of the various coponents. This allows the heat added to the water from the burner heat exchangers 19 to be forced into contact with the blower heat exchanger 14 with little loss to the ambient. Moreover, a low volume system insures that the water flowing within the system is heated relatively quickly whenever a burner assembly 17 is placed in operation. Start-up losses are inherently minimized since a relatively small volume of water must be heated before the entire system reaches a steady state condition.

It should also be appreciated that there are several unique advantages to maintaining the volume of the system as small as possible and by arranging the system in a reverse parallel flow relationship. Referring to FIG. 1, it should be observed that by circulating the water through the burner heat exchangers in parallel, heated water flowing out of the lefthand burner assembly flows directly to the blower heat exchanger 14 without any losses occurring from warm water being directed across or through a nonoperating burner assembly. This flow arrangement minimizes the standby losses occurring in each of the non-operating burner assemblies.

Moreover, since the heated water flows directly to the blower heat exchanger without having to flow through or across otherwise relatively cool piping, steady state conditions are achieved relatively soon after each burner assembly is placed in operation. Only the relatively short and insignificant length of pipe joining the already operating burner assembly with the adjacent burner assembly needs to be brought up to temperature comparable to that of the piping between the previously operating burner assembly and the blower heat exchanger 14. Since the inherent mass of the system is low, the overall time response of the system is fast.

It should also be appreciated that the system is designed so that only a fraction of the total system volume flows through the non-operating burner assemblies. Moreover, that fraction decreases as the additional burner assemblies are placed in operation. More importantly, even though as more and more burner assemblies are placed in operation, the temperature difference between the fluid flowing through the non-operating burner assemblies and the temperatures at the interior of the burner assemblies increases, there are fewer such idle heat exchangers. The net effect of decreasing flow and a corresponding increasing temperature difference is that standby losses are relatively constant and the startup losses are always relatively small.

Since a steady state condition is quickly reached soon after any additional burner assembly is placed in operation, and since the combustion efficiency of an individual gas burner is at its highest when a steady state condition is achieved, it follows that the gas burner assemblies under the present arrangement operate for the most part at their highest combustion efficiency throughout the heating season.

In the preferred form, each gas burner assembly 17 includes a relatively small or incremental (e.g., 20,000 BTU/hr) gas burner 18 and a burner heat exchanger 19 mounted in a compact metal housing 21. The burner heat exchanger 19 includes a series of annular fins 19a distributed axially along a conduit 19b which carries the water to be heated. The modular or incremental burner assemblies have a fraction of the mass and a fraction of the combustion chamber volume found in conventional heating arrangements. This design feature improves the time response of the system. Moreover, the heat transfer area of the burner heat exchangers is large relative to water in the conduit 19b such that the rate of heat transfer is proportional to the temperature difference across the heat exchanger walls. The gas burner 18 has a series of flame apertures and produces heat and hot combustion gases which pass upwardly and transversely across the burner heat exchanger 19 within the housing 21 heating the water in the burner heat exchanger. The spent combustion gases are then discharged through a flue 22. Each flue 22 communicates with a common exhaust pipe 23 which vents the spent combustion gases to the atmosphere. This arrangement reduces startup and standby losses.

To provide the fuel for each gas burner 18, a combustable gas-air mixture is supplied to the gas burner through a mixing tube 24. Secondary air for combustion of the gas is provided uniformly to the burner (e.g., through a series of apertures 25 along the side walls of the housing 21 in the vicinity of the gas burner). The gas for the mixing tube 24 is supplied through a gas tube 26 from an igniter control and gas valve assembly 27. Air shutters 28 permit the entry of primary air into the mixing tube 24. These components are conventional and their operation is well understood by those skilled in the art.

Gas fuel for all the gas valve assemblies 27 is supplied through a gas supply line 29 which is provided with branches leading to the various gas valve assemblies so as to serve as a "gas supply manifold." From the gas supply line 29, the gas is passed through each gas valve assembly 27 to the gas tube 26 by a valve which is operated by a solenoid 31. The gas valve assembly 27 further includes means for firing a gas igniter 32 when the valve opens to supply gas to the gas burner 18. The gas igniter 32 ignites the gas-air mixture in the gas burner 18 when the valve has been opened to burn the gas. Approved AGA gas igniters are readily available to insure that energy is not wasted by keeping a pilot light continuously in operation.

It will be understood that the combustible gas fuel can be natural gas, liquified petroleum gases or any other suitable gas.

Each burner housing 21 defines an upper chamber and a lower chamber, with the burner heat exchanger 19 mounted on the housing intermediate the two chambers. The gas burner 18 heats the water in the burner heat exchanger 19 using the hot combustion gases from the gas burner focused on the burner heat exchanger. The water is heated approximately 20° F. Specifically, the lower chamber of the housing has walls which taper inwardly and upwardly from the vicinity of the gas burner to the location of the burner heat exchanger fins 19a.

As will be described in more detail at a later point in this discussion, the activation and de-activation of each burner assembly 17 is supervised by a microprocessor control circuit which varies the total number of gas burners 18 which are in use, depending upon the amount of heat required. The amount of heat provided to the space being heated is determined, in part, by the temperature of the circulating water when it enters the heat exchanger 14. The higher the water temperature, the greater the amount of heat transferred to the surrounding air. The amount of heat transferred is, in part, also determined by the differential between the actual air temperature in the space heated by the heat exchanger 14 and the desired set point temperature for that same space.

Figure 3:
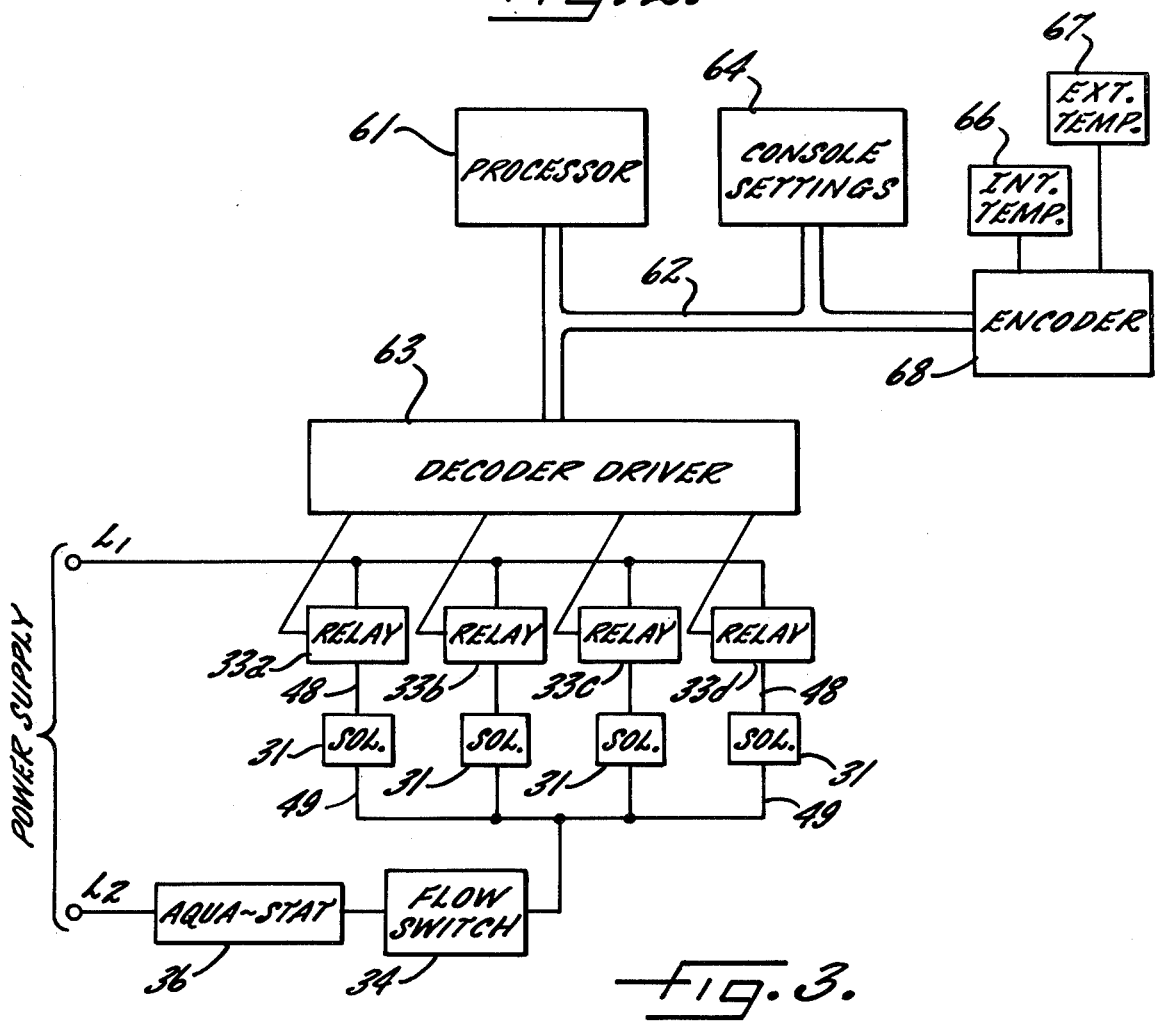
FIG. 3 is a block electrical connection diagram of a microprocessor-based control system used with the apparatus shown in FIG. 1.

With additional reference to FIG. 3, each solenoid 31 controlling the firing of a burner assembly 17 is individually actuated by the microprocessor control system.

To this end, one electrical lead of each solenoid is coupled through a relay 33 to one side of a power supply line L1. The other lead of each solenoid 31 is coupled to the other side of power supply line L2 through the series connection including a flow switch 34 and a temperature actuated switch 36, such as an Aqua-Stat. Thus, each solenoid 31 is individually actuable by an associated relay 33 if the series flow switch 34 and temperature switch 36 are both closed to complete the power supply circuit for the solenoids.

Should the water flow in the water circulating pipe 37 stop for some reason (e.g., due to a breakdown of the pump 38 used to circulate the water), the flow switch 34 senses the loss of water flow and opens, thereby deactivating all of the gas burners. Similarly, should the temperature actuated switch 36 detect a water temperature above the safety limit for which it is set, the switch opens, thereby deactivating the gas burners.

As shown in FIG. 1, in order to keep the water lines for the heating arrangement filled and to make up for loss, water is supplied from a readily available supply of water through a shut-off valve 39, which is normally open, and an automatic water feed valve 41. The automatic water feed valve 41 maintains the desired pressure in the system and compensates for any incidental water loss. An expansion tank 42 is provided for holding the water displaced from the water lines when the system is placed in operation after cooling down to ambient conditions. Also provided in the water line are a pressure relief valve 43 and a combined temperature/pressure meter 44. It must be emphasized that the overall volume of water circulating through the system is kept as low as possible by minimizing the length of water circulation piping. In this manner the system responds almost instantaneously once an additional burner assembly is placed in operation. It also minimizes startup losses.

The gas supply for the gas manifold 29 comes from a combustible gas supply line through a main cutoff valve 46, which is normally open in the operation of the heating system. In series with the gas supply line feeding the gas manifold 29 is a pressure regulator valve 47 which regulates the gas pressure in the gas manifold. These components are conventional and their operation is known to those skilled in the art.

CONTROLS

The electrical connections 48 and 49 for the solenoid 31 on each gas burner assembly 17 are coupled to the associated control relay and to one side of the flow switch 34, respectively. Each igniter and valve assembly 27 also receives a power cable 51 for powering the gas ignitor 32. Another power cable 52 supplies power to the pump 38, which can run continuously, or alternatively it can be turned on whenever heat is called for by the controlling device and turned off when a temperature sensor (not shown) detects that the water temperature has dropped below a certain value. Similarly, the power supplied to the blower 13 may depend upon, for example, the operation of the pump 38. In that way, when the temperature of the water circulating in the system drops below a predetermined value, *both* the pump 38 and the blower 13 shut off, thereby conserving energy.

As indicated above, the relays 33 which activate the gas burner solenoids 31 are under the supervision of a microprocessor control system 61 which determines the number of gas burners 18 to be activated at any given time depending upon the differential between the actual interior temperature of the space being heated and the set point temperature. By sequentially and cumulatively firing and extinguishing the gas burners in accordance with the demands of the space being heated, the heat produced by the heating system can be adjusted in small increments so that the temperature of the space being heated can be maintained substantially constant at the set point temperature. Thus, wide fluctuations in temperature due to successive overshooting and undershooting of the set point temperature are substantially eliminated.

From the foregoing it should be clear that startup losses are reduced by having burner assemblies 17 which can be rapidly heated from a cold condition to an operating condition. Similarly, standby losses are reduced because of the relatively small mass of air confined within each combustion chamber. To this end the burner heat exchangers 19 are made of copper or other thermally conductive material and have a heat transfer surface area that is large enough relative to the volume of water in the associated conduit 19b for a given flow rate therethrough to heat the water substantially instantaneously to its steady state value when its burner is ignited. When used in a forced air system, the periodic cycling of the blower is also minimized, so that a constant, even flow of moderately heated air can be maintained—rather than the series of repeated bursts of hot air typical of currently existing ordinary heating systems and arrangements. In this regard a variable speed blower can be used to optimize the efficiency of the heating system.

MICROPROCESSOR CIRCUIT

In FIG. 3, a microprocessor circuit having the requisite Central Processing Unit (CPU) and attendant memory and other circuitry for controlling the multiple burner assemblies is indicated generally at 61. It communicates on a data bus 62 with a decoder driver 63 which is operable to activate one or more of the relays 33. When properly addressed, the decoder driver 63 decodes a multi-bit word on the bus 62 supplied by the microprocessor 61 in order to determine which of the relays 33 to activate. The relays are activated sequentially and cumulatively each time there is an address to the decoder driver calling for activation of one or more of the relays 33. For example, if one relay is to be activated, the relay 33a is activated; if two relays are to be activated, then two relays 33a and 33b are activated, and so on. Correspondingly, one burner assembly 17, for example, the burner assembly at the left in FIG. 1, can be the first burner activated, the second burner assembly from the left, the second, and so on. The specific sequence in which the various burners are activated can be varied by programming the mircroprocessor so that the total burner "on-time" is distributed uniformly among the various burners.

In order to store a variety of set point temperatures for different days of the week and different times of the day in the memory of the microprocessor circuit 61, a console 64 for data entry and readout is connected to the data bus 62. Through the console 64, the desired temperature set points are entered into the microprocessor 61. In addition to the keys for entering data on the console 64, there are also temperature and time readouts which display the current set point temperature and the time that this temperature went into effect, based upon information supplied from the microprocessor circuit 61.

In order to obtain actual temperature readings for comparison with the temperature set points entered through the console 64, an interior temperature sensor 66 located in the interior of the space to be heated and an exterior temperature sensor 67 located outdoors are provided. The outputs of the temperature sensors are coupled through an encoder 68 which converts the temperature outputs to microprocessor recognizable codes and places the appropriate data on the data bus 62 upon request from the processor 61. The interior temperature sensor 66 senses the temperature in the building or other space to be heated, and the exterior temperature sensor 67 detects the outdoor temperature in order to "anticipate" the amount of time for heat to build up to a new, higher, set point temperature (i.e., recovery). This will be explained in more detail hereinafter.

Figure 2:
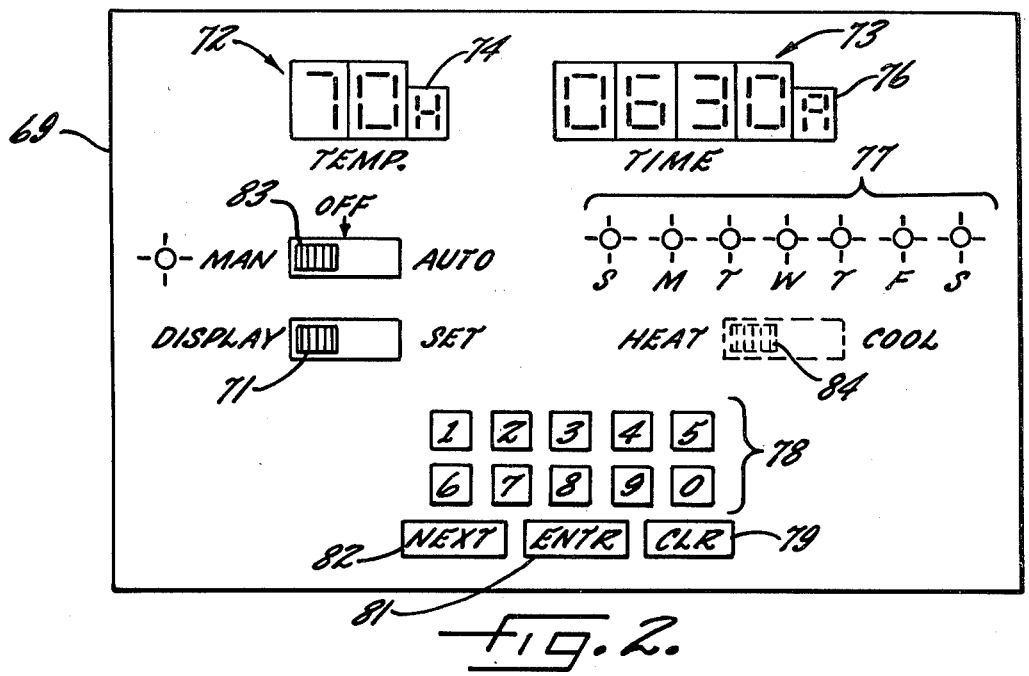
FIG. 2 is a front view of a readout and control panel used with a heating system encompassing the apparatus shown in FIG. 1.
Figure 4:
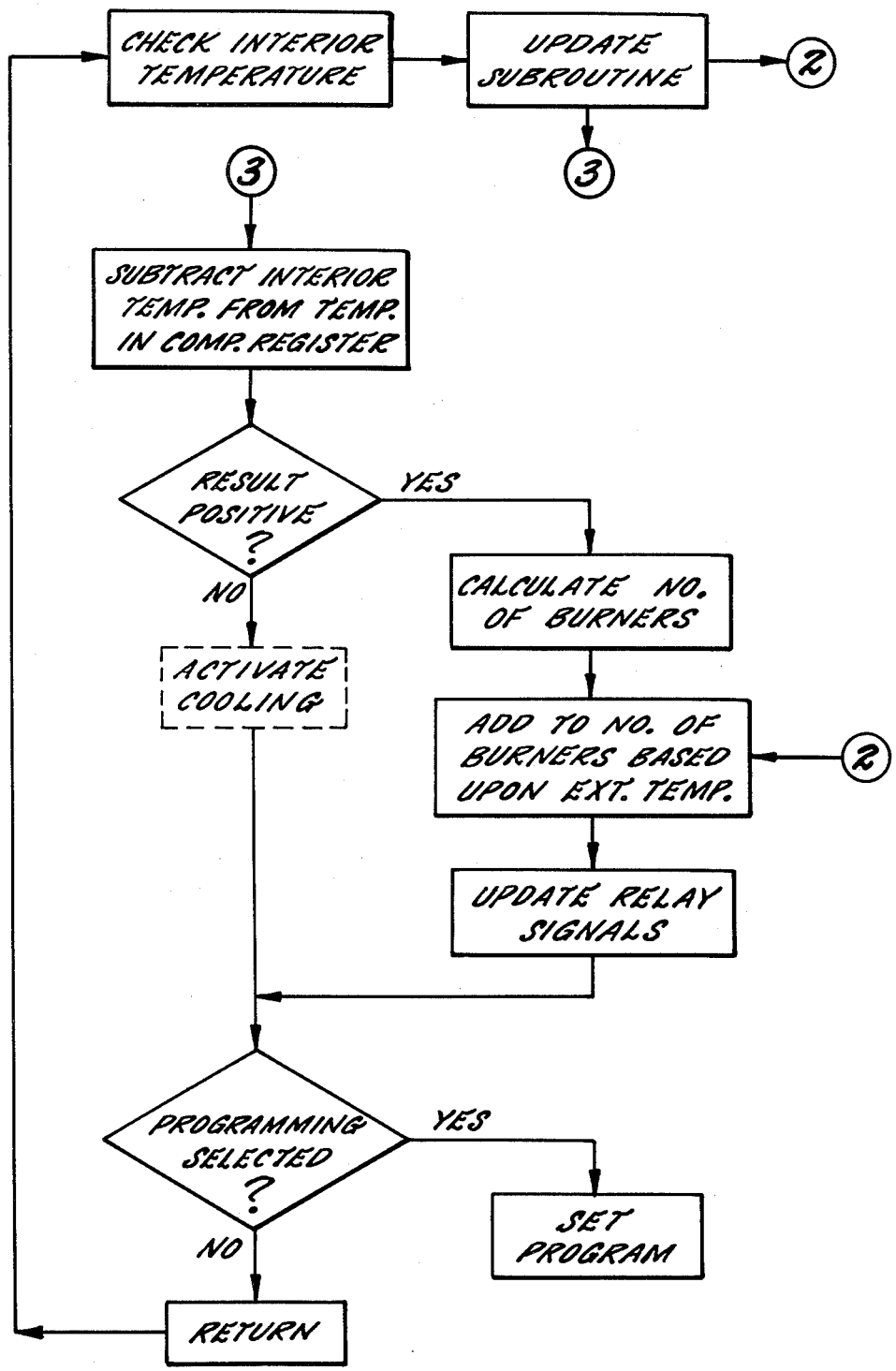
FIG. 4 is a flow chart showing the basic sequence of operation of the microprocessor shown in FIG. 3.
Figure 5:
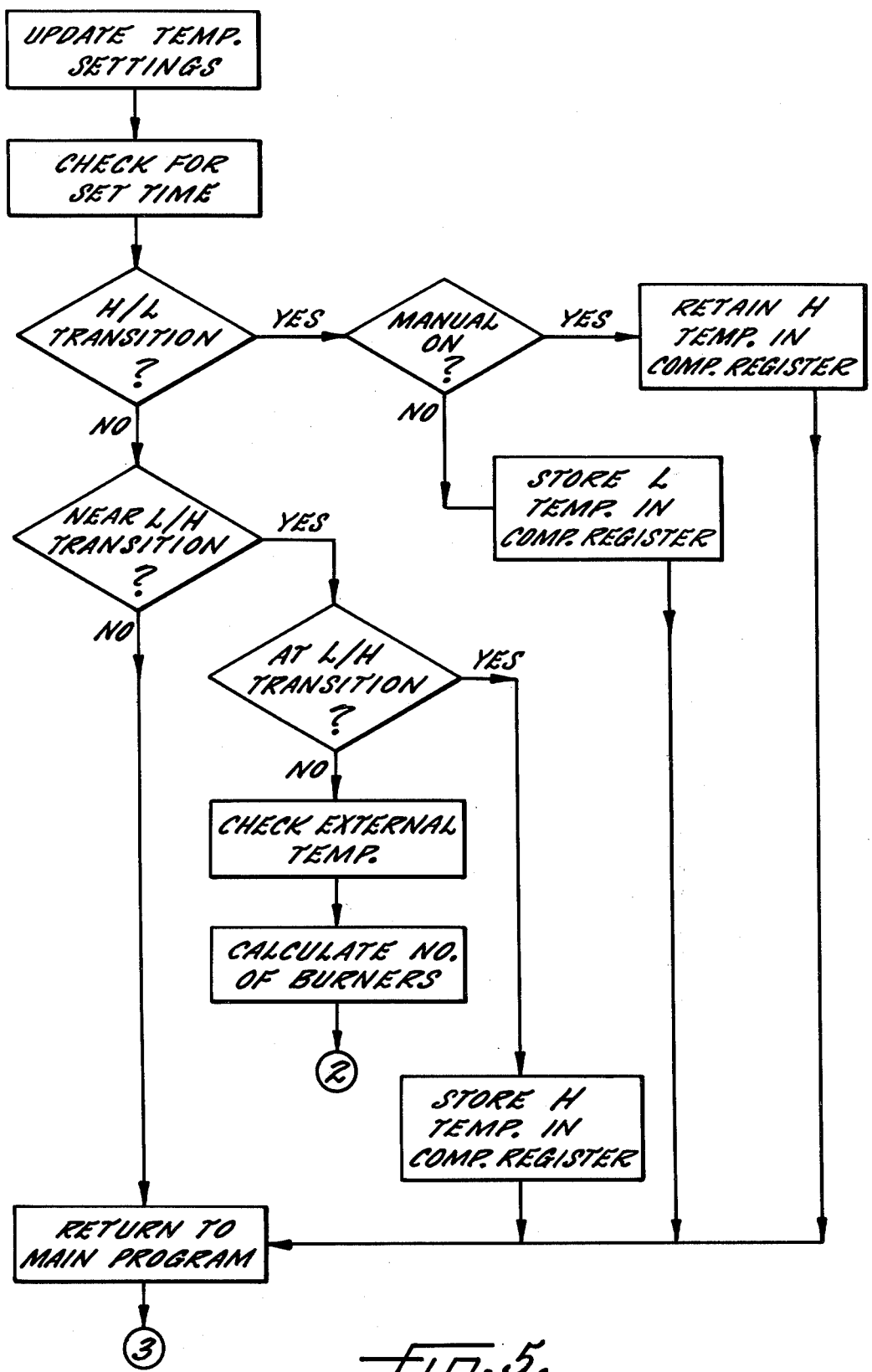
FIG. 5 is a flow chart showing a control setting update subroutine used with the basic operating sequence shown in FIG. 4.
Figure 6:
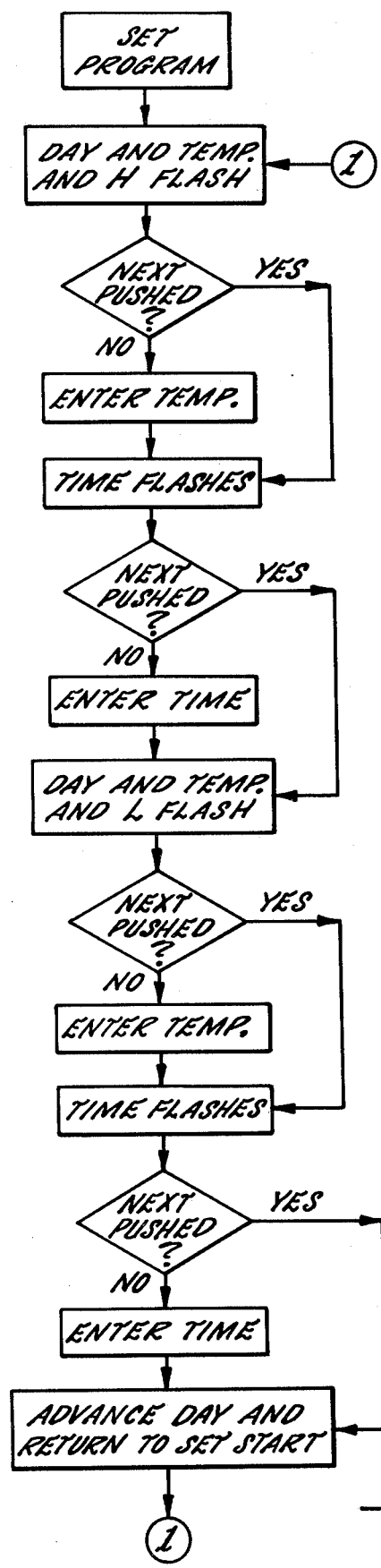
FIG. 6 is a flow chart of a programming subroutine for the basic operating sequence shown in FIG. 4.

Illustrative flow charts of the sequence of operation for the microprocessor circuit 61 to control the heating system are shown in FIGS. 4 and 5. Prior to describing the sequence of operation in connection with these flowcharts, it is first appropriate to discuss the method of entry of data into the memory of the microprocessor circuit 61 as illustrated in FIG. 6, in conjunction with a Control and Readout Panel (CRP) 69 of the console 64 as shown in FIG. 2.

First, the MODE SWITCH 71 on the console CRP 69, which is shown in the DISPLAY position, is switched to the SET position. When the microprocessor 61 next checks the condition of the MODE SWITCH 71, it will execute the subroutine diagrammed in FIG. 6 in flow chart form. This subroutine allows one to enter temperature and/or time settings into the microprocessor memory.

In the present instance, the memory portion of the microprocessor circuitry 61 is arranged to store two set point temperatures for each day of the week. Normally, one is a higher temperature during the day and the other is a lower temperature for nighttime. A typical day would begin with the lower set point temperature from the previous day being used by the microprocessor with a time stored at which the temperature setting changes to the higher temperature. A second, lower temperature for the afternoon or evening and following morning is stored along with the time this lower temperature is to take effect.

In the display portion of the console CRP 69, there is a two digit Fahrenheit Temperature Display 72 and a four digit Time Display 73. An additional indicator 74 (hereinafter referred to as the "High-Low Indicator"), adjacent the Temperature Display 72, indicates an "H" or "L" depending upon whether the high or low temperature is displayed. Similarly, there is a one character alphanumerical display 76 (hereinafter referred to as the "AM/PM Indicator") adjacent the digital time display 73 to indicate whether the time is AM or PM. These two parts of a day are represented by an "A" or a "P", respectively.

As indicated above, when the MODE SWITCH 71 is placed in the SET position, a data entry program or subroutine is initiated by the microprocessor circuitry 61. First, the first day-of-the-week indicator, the left hand "S" in the row of day-of-the-week indicators 77, and the Temperature Display 72 and an "H" in the High-Low indicator 74 all begin to flash. This indicates that the microprocessor memory is ready to store the high set point temperature for the first day of the week, Sunday. In order to enter a high set point temperature for Sunday, the desired two digit Fahrenheit temperature is placed in the display by pressing the appropriate keys on the numeric key pad 78. If an incorrect temperature has been placed in the display, depressing the CLEAR key 79 will clear the Temperature Display 72 so that a new temperature may be entered. Once a correct temperature has been set in the Temperature Display 72, the ENTER key 81 is depressed to enter this temperature into the processor memory. After the ENTER key has been pushed, the Temperature Display 72 and the display High-Low Indicator 74 cease flashing.

The time display now flashes to indicate that a time at which the entered high temperature is to take effect on Sunday is to be entered on the numeric key pad 78. Initially, the AM/PM Indicator 76 will be set at an "A." If the high temperature for the day is to begin after noon, the AM/PM Indicator 76 may be converted to a "P" by depressing the CLEAR button 79 before entering any time digits. As before, after placing into the display the desired time for changing the set point temperature to the high set point temperature for Sunday, the ENTER key 81 is depressed and the displayed time is entered into the microprocessor memory.

Next, the day of the week and temperature displays flash once again, with the High-Low Indicator 74 now being an "L." The low set point temperature for Sunday is now placed into the display by the key pad 78 and entered in the microprocessor as above.

Next, the time display flashes once again, this time with the AM/PM Indicator 76 being a "P," since normally the change from a high temperature set point to a low temperature set point is in the afternoon. Once again, however, depressing the CLEAR button before entry of a new time will alternate the AM/PM Indicator 76 between "A" and "P" so that AM or PM may be selected. Once the desired time for the change to the low set point temperature is in the digital Time Display 73, it is entered into the microprocessor by depressing the ENTER key 81.

After the two temperatures and times have been entered for Sunday, the processor subroutine advances to the next day, Monday, and returns to the beginning of the just-described sequence, with the Monday indicator, the Temperature Display 72, and the "H" in the High-Low Indicator 74 all flashing. This indicator will continue to cycle in this fashion in response to the depression of the ENTER key 81 after each entry of data.

Alternatively, in lieu of entering data, the NEXT key may be depressed which will advance the processor through each step of the routine without the entry of data. When the last entry has been made for Saturday, the subroutine returns to the first Sunday temperature entry again. If the NEXT key is depressed and held down, the program will cycle through the subroutine more quickly so that a particular day of the week may be reached for entry of data without requiring repeated depression of the NEXT key. To return to the normal operation of the microprocessor 61, the MODE SWITCH 71 is returned to the DISPLAY position from the SET position.

During normal operation, the microprocessor circuitry 61 is continuously comparing the indoor temperature of the heated building or space with the particular set point temperature, high or low, in effect at that time of the day. the normal operation of the microprocessor circuitry 61 in making these comparisons is outlined in the flow charts of FIGS. 4 and 5. To initiate a temperature comparison, the microprocessor first checks the actual interior building air temperature from the temperature sensor 66 by interrogating its encoder 68, which responds by placing the coded actual interior temperature on the data bus 62 from which it is read by the microprocessor circuitry 61. The microprocessor next initiates and updates the subroutines, which are illustrated in flow chart form in FIG. 5. The microprocessor circuitry 61 constantly has a set point temperature stored in a particular memory location, such as a "comparison register", for comparison with the measured or sensed interior building air temperature. In order to update this set temperature, the processor checks with an internal "clock" to determine the time of day and day of the week and then compares this time with the two transition times for that day stored in its memory. It will be recalled that for each day of the week, there is a transition time, generally in the morning, when the set point temperature changes from the previous low temperature to a new high temperature. Similarly, there is a second, high-to-low, temperature transition time for each day of the week.

In updating the current set point temperature for use by the microprocessor for comparison with the measured temperature, the microprocessor first checks the present time of day against the high-to-low and low-to-high transition times stored in its memory. If the present time now corresponds to the time for a transition from the high set point temperature to the low set point temperature, the microprocessor prepares to enter the new low set point temperature into the comparison register.

Upon determining that it is a high-to-low transition time for that particular day of the week, the microprocessor interrogates the console 64 to determine if the operating switch 83 is in the MANUAL, AUTOMATIC or OFF position. If the operating switch is in the AUTOMATIC position, the microprocessor replaces the high set point temperature stored in its comparison register with the low set point temperature for that day from its memory. If the operation switch is in the MANUAL position, this setting "overrides" the switching of the comparison register from high to low set point temperature, and the comparison register retains the high set point temperature for that day until the operation switch 83 is returned to the automatic mode. This allows the temperature in the area being heated to be maintained at a "higher" temperature on a particular day by manual control without reprogramming. The control system is turned off and the burner assembly deactivated if the operation switch 83 is in the OFF position.

If the microprocessor determines that it is not time for a high-to-low transition, it also checks the low-to-high transition time. If the time is not near a low-to-high transition time, then the microprocessor returns to the main program (as shown in FIG. 4). If a low-to-high transition time has actually been reached, the new, high set point temperature is stored in the comparison register of the processor.

If the actual time is near a low-to-high transition time but has not yet reached that time, the microprocessor 61 interrogates the encoder 68 to determine the exterior temperature from the exterior temperature sensor 67 and compares the exterior temperature against an internally stored scale of temperatures to determine if the outside temperature is low enough to "justify" anticipating the low-to-high temperature transition by igniting one or more of the burner assemblies in advance of the transition time. Based upon the internal table stored in the microprocessor memory, the number of burner assemblies, if any, is calculated. The microprocessor utilizes this number to control the appropriate relays 33 (as shall be discussed in more detail hereinafter in connection with the operation of the main program).

After the update subroutine of FIG. 5 has been executed (other than in the case of the just mentioned external temperature checking sequence) the microprocessor returns to the "subtraction step" (indicated in the flow chart of FIG. 4 following the numeral "3"). The microprocessor 61 then subtracts the interior temperature from the set point temperature presently in the comparison register to determine whether the temperature in the area being heated is higher or lower than the present set point temperature.

If the interior temperature is *higher* than the set point temperature the result is negative, a cooling apparatus (not illustrated) can be activated. This is an optional feature. It may be readily adapted for use therewith so that the presently described heating apparatus can be easily retrofit onto an existing furnace which includes a cooling system. For example, the microprocessor circuitry 61 would determine if the interior temperature had risen above the set point temperature by more than a preset amount and thereupon, operating through the decoder driver 63, activate an additional relay which would turn on the cooling system. A HEAT-COOL switch 84 (FIG. 2) on the console CRP 69, in in the COOL position, would permit operation of the cooling system instead of the heating system. A simplified alternative subroutine for operating and setting the cooling system instead of the heating arrangement would then be used.

If the interior air temperature is *less* than the set point temperature in the comparison register, the subtraction result is positive, and the microprocessor circuitry 61 then calculates the number of burner assemblies which should be activated based upon the temperature differential. As such, the microprocessor is programmed so that, considering (1) the average temperature difference between the outdoor temperature and the selected set point indoor temperature; (2) the expected heat losses from the house for that temperature difference; and (3) the total number of burner assemblies available for use, at least one burner assembly is in operation during a substantial portion of the total heating season. Moreover, additional burner assemblies are placed in operation incrementally (i.e., additional burner assemblies are fired one at a time) as necessary to maintain a selected maximum allowable temperature difference. Normally, because the temperature change over time between the interior and the exterior of the building changes relatively slow for a given change in outdoor temperature, the time span between the firing of additional burner assemblies is relatively long. For example, if at start-up the interior temperature is more than $1\frac{1}{2}°$ F. lower than the set point temperature, all of the relays 33a through 33d could be activated which would turn on all of the burner assemblies. If the temperature differential is greater than 1° F. but no more than $1\frac{1}{2}°$ F., relays 33a–33c could then be activated. If the temperature differential is greater than $\frac{1}{2}°$ F. but no more than 1° F., then two relays 33a and 33b could be activated. Finally, if the temperature differential is greater than 0° F. but no more than $\frac{1}{2}°$ F., only relay 33a would be activated.

Clearly, the range of temperature differentials covered by the four possible burner combinations may be increased for a coarser control of the temperature. Similarly, the set point temperature may be more centered in the range of temperatures activating the burner assemblies by subtracting the interior temperature from the temperature in the comparison register plus 1° F., or by adding 1° F. to the temperature retrieved from the microprocessor memory when it is stored in the comparison register. In this case, then, the first relay 33a would be activated if the interior temperature exceeded the present set point temperature as programmed into the processor memory by an amount between $\frac{1}{2}$° F. and slightly less than 1° F. It should be clear also that a greater, or lesser, number of burners can be used.

At this point in the main operating routine, after the external temperature comparison described above has been made, and after the number of burner assemblies to be activated has been calculated, the microprocessor 61 enters the subroutine in the drawings (FIGS. 4 and 5) at the point indicated by the numeral "2." The microprocessor 61 then adds the necessary number of burner assemblies 17 to that number previously calculated in an earlier execution of the routine so that the appropriate number of relays 33 are activated to anticipate the approaching low-to-high set point transition. If no low-to-high transition is being approached, the relays 33 to be activated by the microprocessor are those determined from the above-described "subtraction calculation." The microprocessor then effects the actuation of the appropriate relays 33, from whichever procedure has been utilized, through the decoder driver 63. After the appropriate number of relays have been activated, the microprocessor returns to the beginning of the basic routine to check the interior temperature of the space being heated (unless of course the SET mode has been selected by the MODE SWITCH 71). If PROGRAMMING has been selected, the microprocessor then goes to the subroutine diagrammed in FIG. 6.

The microprocessor circuitry 61 continuously cycles through the basic routine, updating current temperatures and monitoring the time of day and day of the week in an internal clock to maintain the appropriate set point temperature in the comparison register. This operation keeps the appropriate number of relays 33 activated, continually firing the appropriate number of burner assemblies 17 to properly heat the circulating water, which in turn heats the air passing over the heat exchanger 14.

It should be apparent that a heating system has been described which enables the retention of some of the heat from heated combustion gases for a period of time after the gas burner is turned off since the heated water in the present arrangement serves to store (i.e. high heat capacity) some of the heat of combustion. Subsequently, this heat is transferred to the air directed over the heating chamber heat exchanger 14.

In addition it should be apparent that the described heating arrangement provides a finer control over temperature fluctuations than is provided by a single combustion burner arrangement. Moreover, the illustrated heating arrangement can be conveniently retrofitted onto existing hot air or hot water heating systems.

SECOND EMBODIMENT

Figure 7:
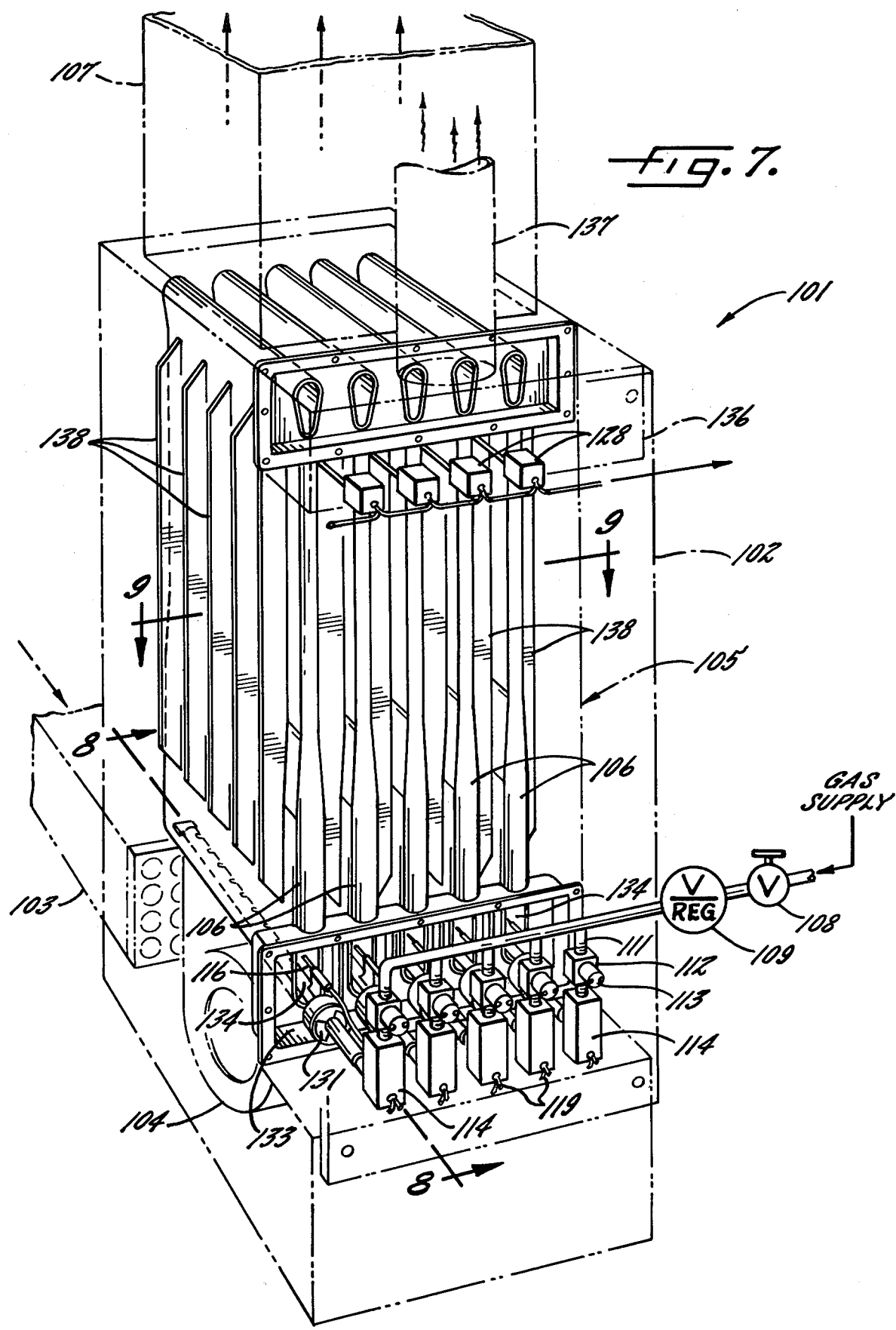
FIG. 7 is a diagrammatic perspective view of another embodiment of the heating system incorporating the present invention with portions of the furnace housing removed.
Figure 8:
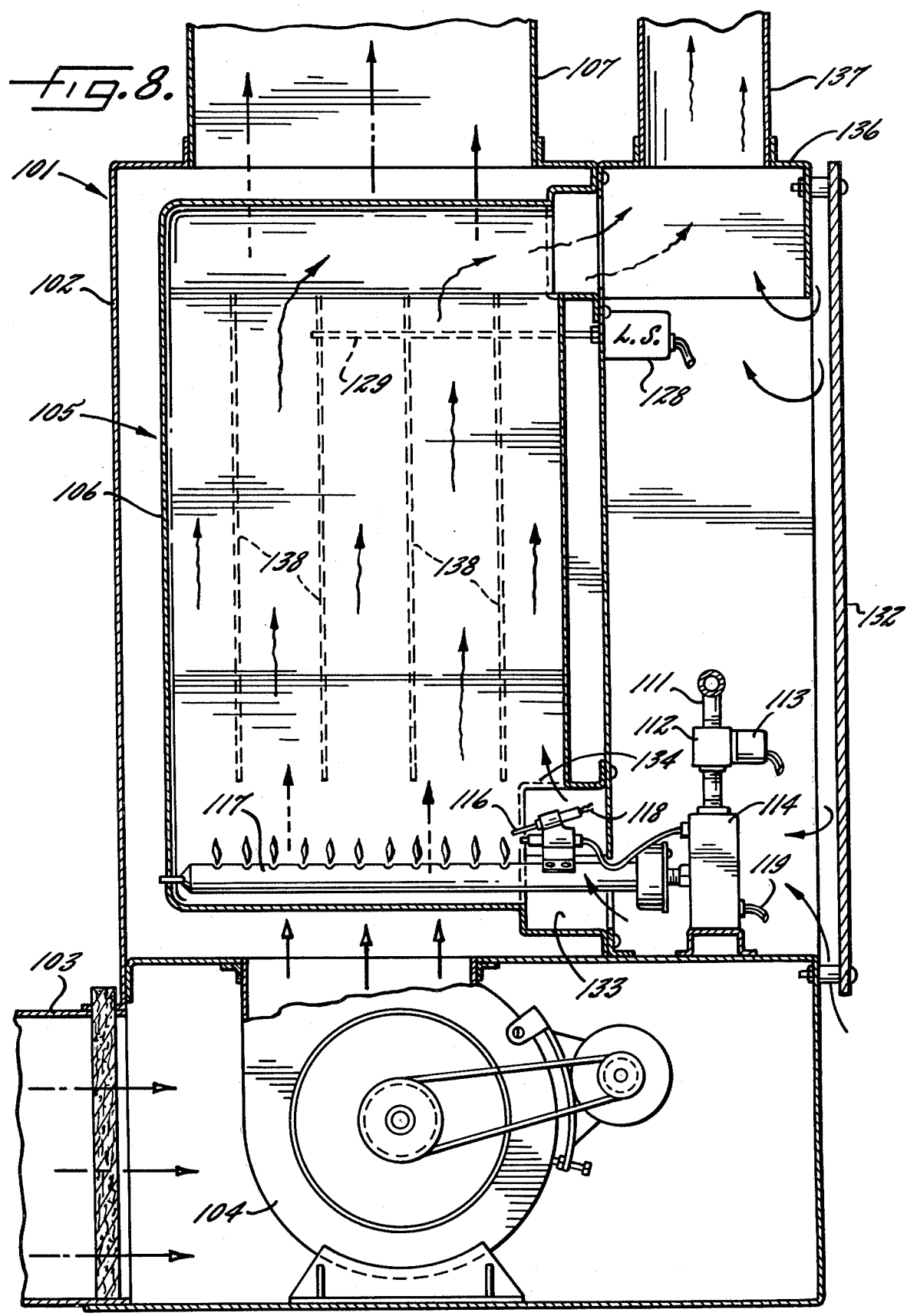
FIG. 8 is a sectional, elevational view of the heating arrangement illustrated in FIG. 7 as viewed along line 8—8 in FIG. 7.

Another heating arrangement embodying the present invention is illustrated in FIGS. 7 through 10. With particular reference initially to FIGS. 7 and 8, the heating system 101 includes a furnace having a housing 102 for supplying heated air to an enclosed space or dwelling. Cool air is drawn in through a return 103 by a blower 104 and forced through a heating chamber 105 to flow in parallel over a plurality of heat exchangers 106. A heated air plenum distributes air from the parallel air streams through a conventional heating duct network (not shown) of the dwelling.

In the illustrated heating system 101 there are five heat exchangers 106, each having an associated gas burner and gas supply line. Gas for all of the burners is received from a gas supply through a valve 108 and a regulator valve 109 and then coupled through five inlet gas supply conduits 111, which are associated with each gas burner. The gas from each gas supply conduit flows through a cut-off valve 112 to an associated gas valve assembly 114. Each cut-off valve 112 is controlled by a solenoid 113. The gas valve assembly 114 is operable when gas is flowing through the cut-off valve 112 to fire a gas igniter 116 to ignite the gas-air mixture flowing out of the gas burner 117. Electrical connections to the igniter 116 are made through leads 118 which are joined to the valve assembly 114. A cable set 119 supplies power to the gas valve assembly.

Figure 10:
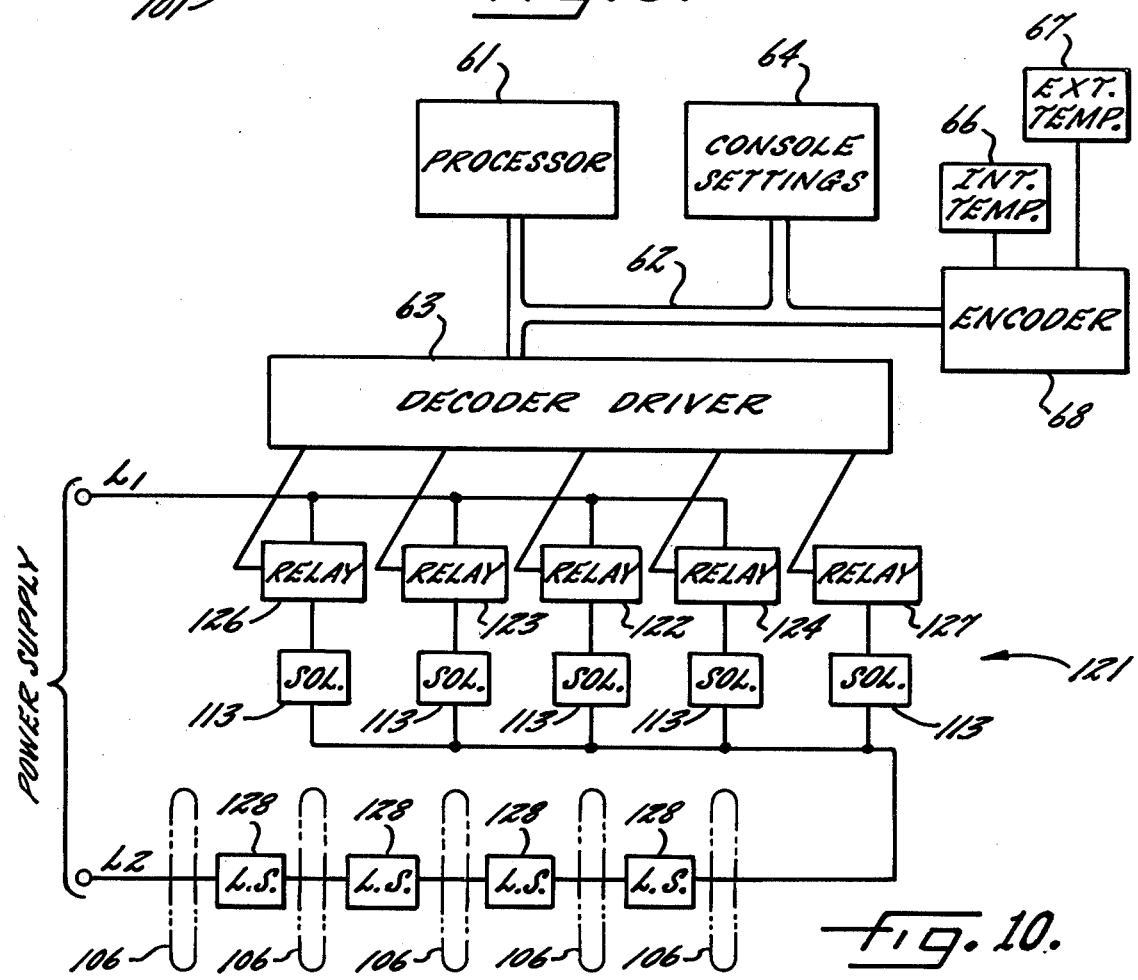
FIG. 10 is a block electrical connection diagram of a microprocessor control system used with the heating arrangement illustrated in FIG. 7.

In order to regulate the temperature of the heated air distributed from the plenum 107 to the dwelling to be heated, a microprocessor arrangement substantially the same as that previously described (See FIG. 3) is employed. With reference now to FIG. 10, the number of burners to be activated is determined by a microprocessor arrangement (indicated generally as 121), which uses relays to operate the solenoids 113 controlling cut-off valves 112. The mircroprocessor arrangement 121 is substantially the same as that previously described (see FIGS. 2 through 6).

The gas burners 117 in the five heat exchangers 106 are fired sequentially and cumulatively, (e.g., first the center gas burner with additional gas burners placed in operation are at a time in an alternating sequence to either side of the center gas burner) by the microprocessor controlled solenoids 113. That is, the first relay to be activated by the microprocessor control system 121 is the relay 122 igniting the gas burner in the center of the five heat exchangers 106. Additional burners are ignited in sequence to increase the heat transferred to the air circulating through the heating chamber 105 around the outside of the five heat exchangers 106 (i.e., relays 123, 124, 126, and 126 are actuated by the microprocessor in that order).

The blower 104 is operated to supply air through the heating chamber 105 whenever any one of the gas burners 117 has been activated by its associated relay and solenoid. This reduces start-up losses since all of the metal of the heat exchangers is kept warm. Standby losses are kept low since the one gas burner is normally operating throughout the heating season.

In order to prevent excess temperatures in the heating chamber 105, (e.g., in the event of a blower failure), four limit switches 128 that are controlled by temperature sensors 129 (located between the five heat exchangers 106) are used to turn off the gas to the gas burners. If the desired "safe temperature" for the heating chamber 105 is exceeded in the vicinity of any one of the temperature sensors 129, the limit switch 128 associated with that temperature sensor opens, cutting the power to the solenoids 113. This loss of power by the solenoids 113 closes all of the cut-off valves 112 thereby shutting off the gas supply to all of the gas burners. As soon as this happens any gas burner 117 which had been activated turns off.

To supply combustion air for the gas burners 117 inside the five heat exchangers 106, primary air is coupled through openings 131 around the gas line from the gas valve assembly 114 to the associated gas burner 117. The size of the primary air openings are set by air shutters associated therewith. Secondary combustion air enters from under and around a cover plate 132 and flows through an opening 133 surrounding the burners 117 and an aperture 134 into each heat exchanger 106. The air combustion product mixture flows upwardly through each of the five heat exchanger 106 to a common hood or plenum 136 and is then vented through a flue 137.

Figure 9:
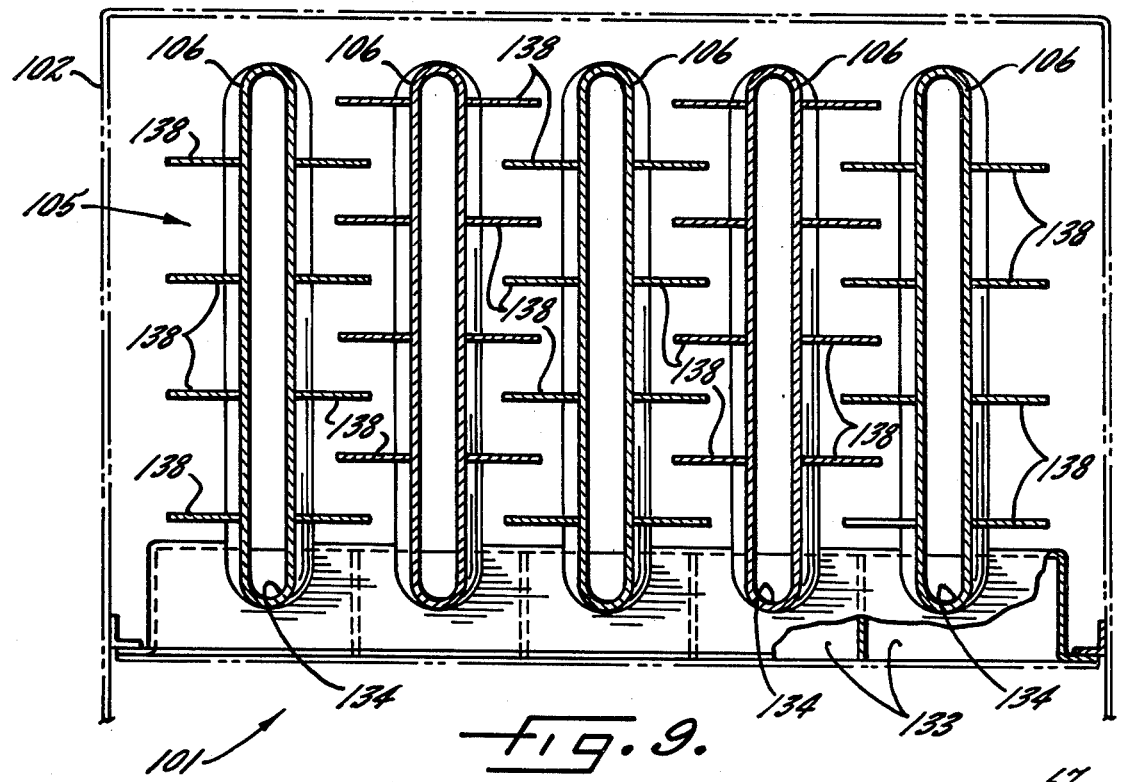
FIG. 9 is a sectional plan view of the heating arrangement illustrated in FIG. 7 as viewed along the line 9—9 of FIG. 7.

In accordance with a further aspect of the invention (as best shown in FIGS. 7 and 9), each of the five heat exchangers 106 includes a series of heat radiating fins 138. Eight such fins are associated with each of the five heat exchangers 106 in the illustrated embodiment. The space between the five heat exchangers 106, is used most advantageously by interlacing the fins 138 (as is best seen in FIG. 9). This maximizes the surface area of the fins 138 on each heat exchanger and a larger surface area, in turn, improves the efficiency of the heat transferred to the surrounding air.

PERFORMANCE

In order to make comparisons under actual conditions, an unoccupied ranch style residence was acquired in Highland Park, Ill. The house contained 1800 square feet of living area plus a partial basement. Construction was brick veneer with 4 inch fiber glass wall insulation; a plaster ceiling with 6 inch fiberglass insulation; and $\frac{5}{8}$ inch insulating glass throughout. Heat losses were calculated to be 75,000 BTU/hr at a 75° F. indoor to outdoor temperature difference. The existing heating unit (approximately 4 years old) was a forced air "BRYANT" Model 150-393 V with an A.G.A. rating of 150,000 BTU/hr. input and 120,000 BTU/hr. output. The heating arrangement that is the subject of the present invention was installed adjacent to Bryant unit. The fan coil section was connected in parallel with the existing distribution duct work with necessary dampers installed to assure that both units would be operating under the same conditions. The gas fuel rating for both units was 1025 BTU/ft$^3$. The installation and comparisons were preformed by a master technician skilled in such measurements.

| BRYANT Model 150-393U 150,000 BTU/hr. input, 120,000 BTU/hr. output (.80 combustion efficiency). | |
|---|---|
| Gas burner consumption | 143.987 C.F.H. (147,587 BTU/hr.) |
| Gas pilot light consumption | .7151 C.F.H. 733 BTU/hr. |
| BRYANT Total Gas | 148,320 BTU/hr. |

| PRESENT INVENTION 99,680 BTU/hr. input, 83,731 BTU/hr. output (.84 combustion efficiency) | | |
|---|---|---|
| Total Number of Burners in Operation | Fuel Consumption (in cubic ft./hr.) | Heat Input (in BTU's/hr.) |
| 1 | 19.883 | 20,350 |
| 1 + 2 | 38.995 | 39,970 |
| 1 + 2 + 3 | 58.730 | 60,200 |
| 1 + 2 + 3 + 4 | 77.804 | 79,750 |
| 1 + 2 + 3 + 4 + 5 | 97.248 | 99,680 |

For the purposes of accuracy, time and cycle meters were electrically attached to the single gas burner valve of the BRYANT unit so that actual running time and number of cycles could be rocorded. These readings were backed up by gas flow meter readings (ROCKWELL model with a $\frac{1}{2}$ ft$^3$ readout) at the start and finish of each run. Five time and cycle meters were used on the furnace system of the present invention so that each burner assembly could be monitored for running time and cycles. Confirming data was supplied by a meter.

The thermostatic device controlling the present invention was installed next to the existing Minneapolis Honeywell Model J87 thermostat that controlled the BRYANT furnace. A two point drum type thermograph model T601 manufactured by Weather Measure Corp. with accuracy of ±0.1 percent was used to monitor the outdoor and indoor temperatures.

The outdoor bulb of the thermograph was located at the north side of the residence in a position as to not be affected by solar heating. The indoor sensing bulb was located directly adjacent to the thermostatic control.

The "BTU per degree temperature rise method" (indoor and outdoor temperature difference) was used for comparison purposes.

The BTU per degree temperature rise was calculated as follows:

BTU/hr. = (Total BTU used)/(Duration of test run in hrs.)

BTU per degree F. rise = (BTU/hr.)/(Temperature rise in degrees F.)

During the test the temperature rise ranged from 21° F. to 43° F.

Figure 12:
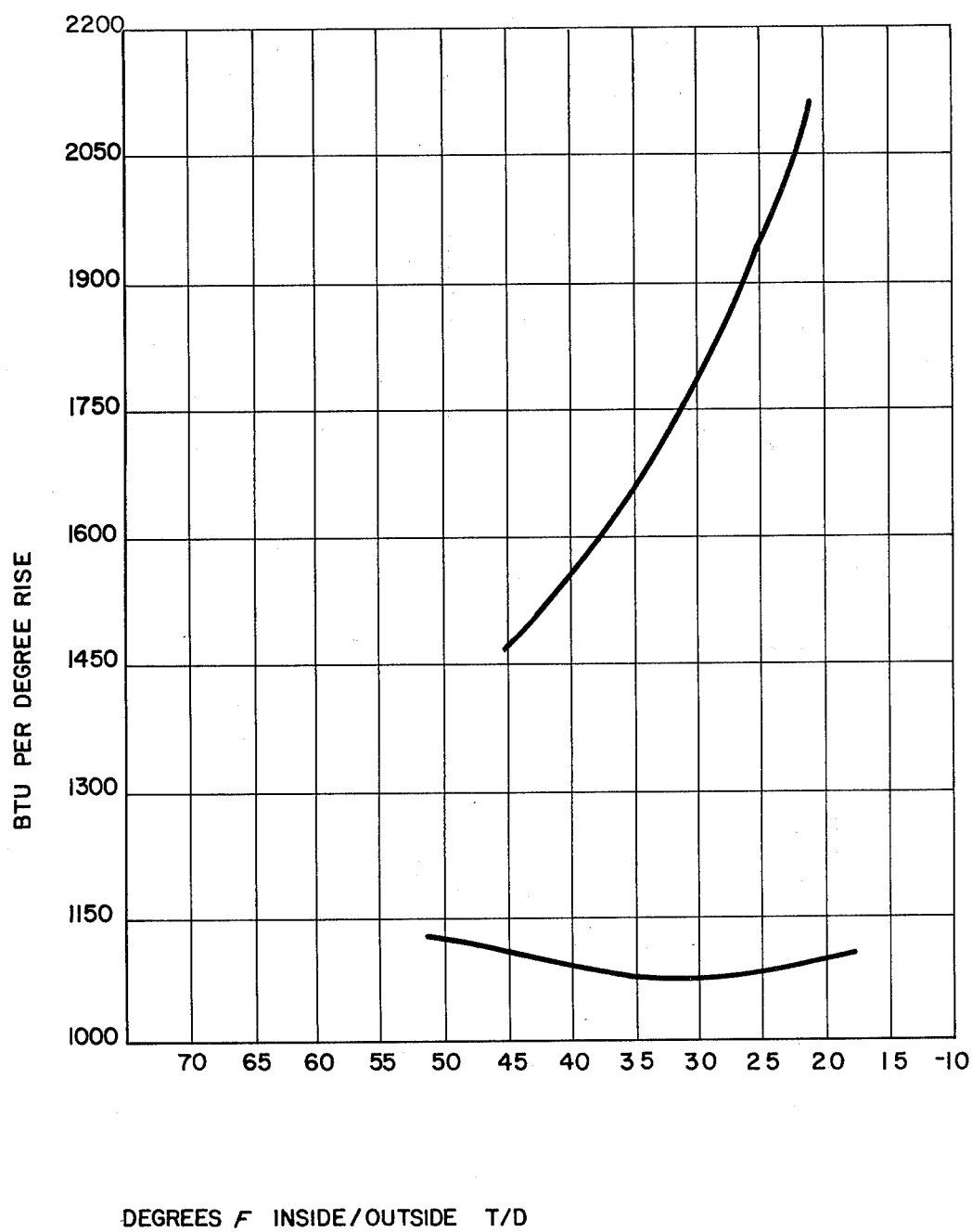
FIG. 12 is a graph comparing the efficiency (in BTU/°F. temperature rise) of two heating arrangements as a function of the indoor to outdoor temperature difference (T/D).

The results are presented in FIG. 12. The data for the conventional unit showed that as the outdoor temperature moderates and the indoor to outdoor temperature difference decreases, the efficiency drops. Also as the temperature difference increases, the efficiency increases.

In contrast, the efficiency of the present invention remained relatively constant. Moreover, since the burners in the present invention were added incrementally the change or overall variation in heat transfer was kept to a minimum (i.e., 1/5, 2/5, 3/5, 4/5, etc.) with an average change of 20% of the total capacity. As such, at least one of the burners is kept continually in operation. This minimizes the startup and the standby losses. This is in contrast with the BRYANT Unit where the change was 100% each time the furnace was operated to produce heat.

Figure 11:
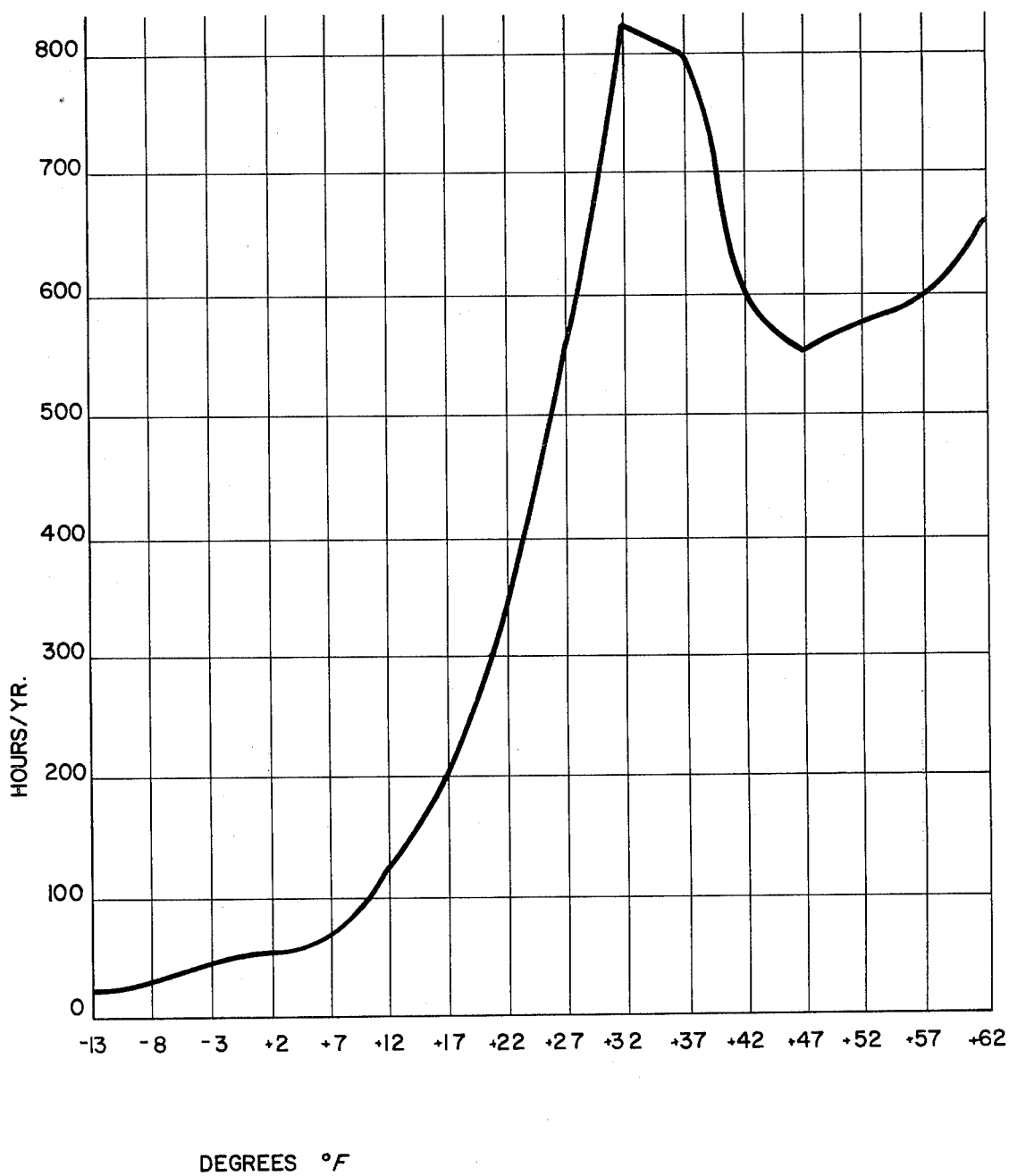
FIG. 11 is a histogram illustrative of the variation in outdoor temperature throughout the heating season.

At the test site, data obtained from the U.S. Weather Bureau showed that: for 63% of the heating season, the outdoor temperature is 37° F. and above; and for 37% of the heating season, the outdoor temperature is 32° F. and below (See FIG. 11). Thus, using a thermostat set point of 70° F., 63% of the heating season will have an indoor to outdoor temperature difference of 33° F. or less, and 37% of the heating season will have an indoor to outdoor temperature difference of 38° F. or more. From this data, it is realistic to conclude that, over the entire heating season, the BRYANT Unit will have an average efficiency of about 1825 BTU per °F. Very little difference in fuel consumption from 23° F. (T/D) to 53° F. (T/D) was observed for the the system embodying the present invention thus, an average efficiency of 1096 BTU per °F. can be expected for the entire season. Thus, from the test comparison it was evident that the BRYANT Unit at 1824 BTU per °F. will consume 66% more fuel than the present invention (at 1096 BTU per °F.).

In addition, the BRYANT Unit cycled an average of 6 cycles per hour (i.e. one full capacity burn every 10 minutes and 6 successive periods of startup losses and standby losses each hour) with a room temperature swing of 3° to 4° F. each cycle. However, the heating system embodying the present invention averaged only 0.11 cycles per hour (i.e. 1 cycle every 8.3 hours or no more than 3 cycles per day). These cycles were, in fact, cycles wherein one burner assembly provided the additional heat input needed to those burner assemblies that were constantly in operation. Thus, the incremental addition of only one burner assembly for a short period of time every 8 hours maintained room temperature within about ½° F. of its set point valve. This is especially significant when it is realized that throughout this period at least one other burner assembly was continuously being fired at its maximum efficiency and the entire heating system was kept within a few degrees of its steady state operating temperature. Thus, over a 24-hour period the BRYANT unit experienced at least 144 full sets of startup losses, 144 full sets of standby losses, and 144 maxiumum or full 148,000 BTU/hr. burn cycles while cycling room temperature 3° F. to 4° F. at least 144 times during the day. In contrast, the heating system embodying the present invention would experience only 3 reduced sets of startup losses, only 3 reduced sets of standby losses and only three 20,000 BTU/hr. incremental burn cycles while running at least one burner assembly continuously at its maximum efficiency, while cycling room temperature in an amount that is imperceptible to the human body, and while running the heating system continuously at steady state where heat transfer efficiencies are maximum.

Thus, from the foregoing description in the amended drawings, it should be evident that the present invention provides an improved heating arrangment not only maximizing comfort but also minimizing the waste of fuel. Although the heating arrangement has been illustrated in reference to two embodiments, it should be readily apparent that there are other specific embodiments which could be used. Accordingly, all such modifications and variations are to be included within the scope of the appended claims.

What is claimed is as follows:

1. A gas-fired space heating system, comprising:
  (a) a plurality of modular incremental gas-fired burner assemblies each including
    a housing,
    heat exchanger means mounted in the housing for effecting heating of a fluid in contact therewith, said heat exchanger means comprised of a thermally conductive material with a heat transfer surface area that is large enough relative to the volume of said fluid in contact therewith and the flow rate of said fluid so that thermal energy is transferred to said fluid substantially instantaneously when said heat exchanger means is heated, and
    a gas burner mounted in the housing for effecting heating of the thermally conductive material of said heat exchanger means;
  (b) a low mass closed loop circulation system for transferring heat from said fluid to a space to be heated, said circulation system including moving means for continuously moving said fluid into contact with said heat exchanger means to effect heating of said fluid when any one of said gas burners is in operation, said moving means circulating substantially all of the fluid confined within said circulation system through said plurality of heat exchangers, whereby the heat added to said fluid by the firing of one additional gas burner is manifested by a direct increase in temperature in the space being heated without a delay due to the time needed to heat a mass of ambient temperature fluid and heat is continuously removed from said system at a rate that is substantially the same as the rate at which heat is added by said gas burners;
  means for measuring the air temperature in said space;
  firing means for individually firing the gas burner in each of said burner assemblies to effect heating of the associated heat exchanger means and incremental heat transfer to said fluid; and
  means for comparing the air temperature in a space to be heated with a reference temperature and for activating said firing means to fire one or more of said burners as a function of the difference between said measured space temperature and said reference temperature.

2. The heating system of claim 1, in which the fluid in contact with said heat exchanger means is water and said heat exchanger means are disposed in a reverse parallel flow relationship with said moving means.

3. The heating system of claim 1, in which the fluid in contact with said heat exchanger means is air.

4. A gas-fired system for heating an enclosed space, comprising:
  a heating chamber;
  a blower for driving air through the heating chamber to said space;
  first heat exchanger means disposed in said heating chamber for transferring heat from heated water contained therein to the air in said chamber, said first heat exchanger having an outlet and an inlet;
  a plurality of gas-fired burner assemblies each including:
    a housing having a vent opening for exhausting combustion gases to the atmosphere;
    a burner heat exchanger mounted in the housing for carrying the water for heating; and
    a gas burner mounted in the housing for heating the water in the burner heat exchanger;
  a water pump for circulating the water in a closed loop between said first heat exchanger means and said plurality of burner heat exchanger means, the outlet of the first heat exchanger means being coupled to its inlet by said closed circulation loop including said plurality of burner heat exchanger means and said water pump;
  means for measuring the temperature of the air in the space into which air from the heating chamber is exhausted;
  firing means for individually firing the gas burner in each burner assembly to effect heating of the associated burner heat exchanger and water circulating therethrough to effect incremental increase in the heat transferred to the water circulated through said first heat exchanger means; and
  means for comparing said measured air temperature with a reference temperature and for activating the firing means to fire one or more of said burners as a function of the incremental heat required to maintain the temperature in said space at said reference temperature.

5. The system set forth in claim 4, wherein said burner heat exchangers are joined together in a reverse parallel relationship with each other and a series relationship with said first heat exchanger.

6. The heating system of claim 4, in which the result of said comparison is the difference between said measured temperature and said reference temperature, said comparison means selectively activating said firing means to sequentially and incrementally fire the burners as a function of said comparison result.

7. The heating system of claim 6, in which said comparison means includes means for selecting a plurality of temperature difference ranges corresponding to said comparison result and for sequentially activating the firing means to fire or extinguish successive burners as the comparison result shifts from one temperature difference range to another.

8. A gas-fired, multi-phase heating system for a space, comprising:
 a heating chamber;
 means for forcing air through the chamber and to said space;
 a first heat exchanger for transferring heat from a heated fluid to the air in said chamber, said first heat exchanger being mounted in the chamber and having an outlet and an inlet;
 a plurality of gas-fired burner assemblies each including:
  a housing defining an upper chamber having a vent opening for exhausting combustion gases and defining a lower chamber,
  a burner heat exchanger mounted in the housing intermediate the upper and the lower chamber for transferring heat to the fluid contained therein, and
  a gas burner for heating a fluid in the burner heat exchanger mounted in the lower chamber of the housing, which lower chamber in a typical crossection tapers from the general vicinity of the gas burner to the location of the burner heat exchanger, whereby heated combustion gases from the gas burner are focused on the burner heat exchanger;
 circulating means for circulating the fluid in the first heat exchanger through the burner heat exchangers and back to the first heat exchanger, the outlet of the first heat exchanger being coupled to its inlet by the burner heat exchangers and said circulating means;
 means for measuring the temperature of the air in the space into which air from the heating chamber is exhausted;
 firing means for individually firing the gas burner of each said burner assembly to effect heat transfer to the fluid circulating through the burner heat exchanger associated therewith to thereby change the heat transferred to said first heat exchanger in discrete increments; and
 means for comparing said measured air temperature with a reference temperature and for activating the firing means to fire different numbers of said gas burners in accordance with the magnitude of the difference between said temperatures.

9. The heating system of claim 8, in which the burner heat exchangers are connected in parallel between the outlet of the first heat exchanger and its inlet, and in which the fluid which is circulated is water.

10. The arrangement of claim 9, in which the comparison means activates the firing means to fire said burners sequentially and cumulatively.

11. A heating arrangement, comprising:
 a heating chamber;
 means for forcing a first fluid from the heating chamber to a second chamber;
 a first heat exchanger for carrying a heated second fluid, said first heat exchanger being mounted in the heating chamber and having an outlet and an inlet;
 a plurality of burner assemblies each including:
  a housing,
  a burner heat exchanger mounted in the housing for carrying said second fluid and for transferring heat to said second fluid, and
  a burner mounted in the housing for heating that portion of said second fluid in the burner heat exchanger;
 means for circulating said second fluid from the first heat exchanger through all the burner heat exchangers and back to the first heat exchanger, the outlet of the first heat exchanger being coupled to its inlet by the burner heat exchangers and said circulating means;
 means for measuring the temperature in said second chamber;
 firing means for individually firing the burner of each said burner assembly;
 means for comparing said second chamber temperature with a selected reference temperature and for activating said firing means to fire one or more of said burners according to the difference between said temperatures to effect an incremental increase in the temperature of said second fluid circulating through said first heat exchanger in response to the firing of each burner;
 a clock;
 means for storing a plurality of reference temperatures and an associated time and for selecting a reference temperature from the plurality of reference temperatures dependent upon the time associated with the clock.

12. A method for heating an enclosure to maintain the temperature of the enclosure generally uniform by burning fuel while optimizing the utilization of the fuel, comprising the steps of:
 (a) locating a plurality of spaced apart modular burner assemblies in a parallel array so as to define a first assembly and an oppositely disposed last assembly, each of said burner assemblies including
  a walled housing,
  heat exchanger means for transferring heat to a first fluid, and
  burner means mounted in said housing for heating said heat exchanger means, whereby the heat produced by said burner means is used to increase the temperture of the first fluid;
 (b) circulating substantially all of said first fluid in parallel through all said burner heat exchangers and then circulating the fluid flowing out of said burner heat exchangers through said enclosure in a generally closed loop, said fluid entering said burner heat exchangers at one end of said array adjacent said first assembly and leaving at the opposite end of the array adjacent said last assembly;
 (c) transferring at least a portion of the heat added to the circulating first fluid from said incrementally fired burner assemblies to the interior of said enclosure, whereby heat is transferred to said fluid by a forced circulation system disposed in a reverse parallel flow relationship;

(d) sizing the burner assemblies such that the steady state thermal energy produced by all of said burner assemblies when transferred to the interior of said enclosure by the forced circulation of said first fluid being generally equal to that heat transferred from the interior of said enclosure to the exterior of said enclosure for a selected first temperature difference between the interior and the exterior of said enclosure, the steady state thermal energy produced by one of said burner assemblies when transferred to the interior of said enclosure through the forced circulation of said first fluid being generally equal to the heat transferred from the interior of said enclosure to the exterior of said enclosure for a selected second temperature difference between the interior of said enclosure and the exterior of said enclosure, said second temperature difference being a fractional part of said first temperature difference, whereby the temperature in said enclosure is maintained relatively constant by firing at least one and less than all of said burner assemblies when said temperature difference has a value generally less than said first temperature difference and greater than or equal to said second temperature difference;

(e) measuring the temperature at the interior of said enclosure;

(f) comparing the temperature at the interior of said enclosure with a selected reference temperature;

(g) activating one or more of said burner assemblies according to the difference between said reference temperature and the temperature at the interior of said enclosure, said last burner assembly being activated when the difference in temperature between said reference temperature and the exterior of said enclosure is generally greater than said second temperature difference, whereby heat is transferred to the interior of said enclosure almost instantaneously;

(h) operating at least one burner assembly at its highest combusion efficiency during a substantial portion of the heating operation to minimize start-up losses, and standby losses;

(i) activating additional burner assemblies one at a time in response to the difference between said reference temperature and the temperature at the interior of said enclosure when the heat lost from said enclosure exceeds the amount of heat transferred to the interior by the forced circulation of said first fluid, all of said burner assemblies being activated when the difference between said reference temperature and the exterior of said enclosure is generally greater than said first temperature difference, whereby the interior temperature of said enclosure is maintained relatively constant by changing the heat transferred to the interior of said enclosure in discrete increments, each increment being generally a fraction of the total energy transferred to said enclosure when all of the assemblies burner are operated; and (j) sequentially deactivating said burner assemblies one at a time when the heat added to said enclosure exceeds the heat lost to the exterior of the enclosure.

13. A heating system for an enclosure, comprising:
(a) an array of spaced apart modular burner assemblies each including
a walled housing,
a burner heat exchanger carried by said housing for ducting a first fluid through said housing and for transferring the heat therein to said first fluid, and
burner means, mounted in said housing, for heating the interior of said housing, whereby the heat produced by said burner means is used to heat said first fluid flowing through said housing;
(b) forced circulation heating means for circulating substantially all of the mass of that portion of said first fluid to be heated in parallel through said burner heat exchangers and all of the fluid flowing out of said burner heat exchangers through said enclosure, said forced circulation means defining a plurality of conduit elements the volume of which is on the order of the volume of said burner heat exchangers, whereby the time rate of temperature change at the interior of said enclosure due to the firing of one additional burner means is proportional to the time rate of flow of said first fluid, startup losses are minimized, and each gas burner is operated at its highest combustion efficiency soon after being placed in operation;
(c) measuring means for measuring the temperature at the interior of said enclosure;
(d) firing means for individually firing the burner means in each of said burner assemblies;
(e) comparison means, operatively associated with said measuring means and said firing means, for comparing the temperature at the interior of said enclosure with a selected reference temperature and for activating and de-activating one or more of said firing means sequentially and cumulatively according to the difference between said reference temperature and the temperature at the interior of said enclosure to increase the heat transferred to the interior of said enclosure in discrete increments and maintain the interior temperature of said enclosure relatively constant with at least one of said burner means being operated at its highest combustion efficiency, each subsequent firing means being activated by said comparison means when the heat lost from said enclosure exceeds the amount of heat transferred to its interior by said forced circulation means by said burner means then activated, the relative volume of fluid occupying the non-activated burner assemblies decreasing in discrete fractional amounts as the relative temperature difference between the circulating fluid in the non-activated burner assemblies and the interior of the associated walled housing increases as additional burner assemblies are placed in service, whereby the relative amount of standby losses does not substantially increase,
the activated burner assemblies being sequentially de-activated when the heat added to said enclosure exceeds the heat lost.

14. The heating system set forth in claim 13, wherein the steady state thermal energy produced by all of said burner assemblies when transferred to the interior of said enclosure through said forced circulation means is generally equal to the heat loss from the interior of said enclosure for a selected first temperature difference between the interior and the exterior of said enclosure, the steady state thermal energy produced by one of said burner assemblies when transferred to the interior of said enclosure through said forced circulation means is generally equal to the heat loss from the interior of said enclosure for a selected second temperature difference between the interior and the exterior of said enclosure, said second temperature difference being a fraction of said first temperature difference, whereby the temperature in said enclosure is maintained relatively constant by firing at least one and less than all of said burner assemblies when said temperature difference has a value generally less than said first temperature difference and greater than or equal to said second temperature difference, said steady state condition of said furnace system occuring when startup losses and standby losses are minimized and combustion efficiency is maximized.

15. A heating system for an enclosure, comprising:
(a) an array of spaced apart modular burner assemblies each including
a walled housing,
a burner heat exchanger carried by said housing for ducting a first fluid through said housing and for transferring the heat therein to said first fluid, and
burner means, mounted in said housing, for heating the interior of said housing, whereby the heat produced by said burner means is used to heat said first fluid flowing through said housing;
(b) forced circulation heating means for circulating substantially all of the mass of that portion of said first fluid to be heated in parallel to contact said burner heat exhangers and for circulating all of the fluid flowing from said burner heat exchangers to effect heating of said enclosure, whereby the time rate of temperature change at the interior of said enclosure due to the firing of one additional burner means is proportional to the time rate of flow of said first fluid, startup losses are minimized, and each gas burner is operated at its highest combustion efficiency soon after being placed in operation;
(c) measuring means for measuring the temperature at the interior of said enclosure;
(d) firing means for individually firing the burner means in each of said burner assemblies;
(e) comparison means, operatively associated with said measuring means and said firing means, for comparing the temperature at the interior of said enclosure with a selected reference temperature and for activating and de-activating one or more of said firing means sequentially and cumulatively according to the difference between said reference temperature and the temperature at the interior of said enclosure to increase the heat transferred to the interior of said enclosure in discrete increments and maintain the interior temperature of said enclosure relatively constant with those of said burner means having been fired being operated at their highest combustion efficiency, each subsequent firing means being activated by said comparison means when the heat lost from said enclosure exceeds the amount of heat transferred to its interior in response to the burner means then activated, the relative volume of fluid in contact with the non-activated burner assemblies decreasing in discrete fractional amounts as the relative temperature difference between the circulating fluid in contact with the non-activated burner assemblies and the interior of the associated walled housing increases as additional burner assemblies are placed in service, whereby the relative amount of standby losses does not substantially increase, the activated burner assemblies being sequentially de-activated when the heat added to said enclosure exceeds the heat lost.

16. The heating system set forth in claim 15, wherein:
said burner heat exchanger includes at least one of the walls of said housing;
said first fluid is air; and
said forced circulation heating means includes a blower which circulates air around the exterior of said housing and through duct work disposed in a series flow relationship with the interior of said enclosure,
whereby heat from said burner means is transferred to the interior of said enclosure when said burner means and said blower are activated.

17. The heating system set forth in claim 15, wherein each of said burner heat exchangers has an inlet and an outlet connection, said inlet connections being joined to a common inlet header and said outlet connections being joined to a common outlet header;
said first fluid is water;
said forced circulation heating means includes a pump for inducing flow from said inlet header to said outlet header, an enclosed chamber, a blower disposed in a series flow relationship with said enclosure and said enclosed chamber, and heat exchanger means disposed in a series flow relationship with said pump, for ducting said water through said chamber and for transferring heat from water to the air in said chamber, said pump circulating fluid from said outlet header through said heat exchanger means and to said inlet header in a closed loop,
whereby when said pump is running, said blower is in operation and one of said burner means is fired, heat is transferred to said enclosure.

18. The heating system set forth in claim 15, wherein said burner heat exchanger includes at least one horizontal finned tube; said burner means is disposed below and parallel to said finned tube; and said housing includes at least one wall disposed convergingly between said burner means and said finned tube, whereby heat from said burner means flows upwardly along said one wall and transversely across the said tube.

19. The heating system set forth in claim 15, wherein:
said housing defines a lower chamber and a spaced apart upper chamber;
said burner means is a gas burner disposed in said lower chamber, each of said upper chambers are joined to a common outlet plenum for discharging the combustion gases from said gas burner;
said burner heat exchanger includes at least one tube joining said lower chamber with said upper chamber; and
said first fluid is air;
further including a mixing chamber for enclosing said burner heat exchanger tubes, said mixing chamber having an inlet connection and an outlet connection; and
wherein said forced circulation means includes a blower for circulating air from said inlet connection across said tubes and to said outlet connection, whereby the air heated by said gas burners is funneled together in heating said enclosure.

20. The heating system set forth in claim 15, wherein said burner means includes a gas burner and all of the gas burners within said burner assemblies are connected to a common gas supply manifold; and said firing means includes a solenoid valve disposed in a series flow relationship between said gas supply manifold and the associated gas burner.

21. The heating system set forth in claim 15, wherein said housing includes an outlet chamber and a spaced apart firing chamber carrying said burner means and said burner heat exchanger includes a duct disposed between and joining together said firing chamber and said outlet chamber; and further including a common mixing chamber surrounding said ducts, whereby air within said mixing chamber is heated by the hot combustion gases and air flowing through said ducts when at least one burner means is fired.

22. The heating system set forth in claim 15, wherein said first fluid is air and said forced circulation means includes blower disposed in series flow relationship with the interior of said enclosure, whereby air heated by said burner means is transferred to the interior of said enclosure when said blower is running.

23. The heating system set forth in claim 15, wherein said burner heat exchanger is formed from a heat conductive metal, and wherein the surface area of said burner heat exchanger heated by said burner means is sufficiently large such that the rate of heat transfer across said burner heat exchangers is proportional to the temperature difference between the interior and exterior of said burner heat exchanger.

24. The heating system set forth in claim 15, in which said comparison means includes:
 (a) means for selecting a plurality of temperature difference ranges corresponding to said comparison result and;
 (b) means for sequentially activating each of said firing means to activate or de-activate one or more of said burner means as the comparison result shifts from one temperature difference range to another.

25. The heating system set forth in claim 15, wherein said burner heat exchangers are disposed in a parallel flow arrangement so that said first fluid when circulated by said forced circulation heating means flows across each of said burner heat exchangers.

26. The heating system set forth in claim 15, wherein said comparison means includes:
 (a) a clock timer;
 (b) means for storing a plurality of reference temperatures each having an associated time; and
 (c) means for selecting a reference temperature from said plurality of reference temperatures depending upon the time associated with said clock timer, whereby the temperature in said enclosure is compared with a reference temperature depending upon the time on said clock timer in activating and deactivating said firing means.

27. The heating arrangement set forth in claim 15, wherein each burner heat exchanger includes a horizontal finned tube, and wherein the walls of said housing are substantially disposed against the edges of said fins, whereby said housing focuses the heat from said burner means towards said finned tube.

28. The heating system set forth in claim 23, wherein the sum of the products of the effective heat transfer area of each burner heat exchanger and the temperature difference between the interior and the exterior of that burner heat exchanger is generally equal to the product of the number of heat exchangers with the effective heat transfer area of any heat exchanger and the temperature difference between the interior of the heat exchanger and the exterior of that heat exchanger.

29. The heating system set forth in claim 15, wherein the interior volume of each walled housing is joined to a common flue which is vented to the atmosphere, whereby the heat transferred to the atmosphere by the convection of air flowing through the deenergized burner assemblies when at least one of said burner assemblies is energized is less than that heat transferred to the atmosphere from a burner assembly having an interior volume generally equal to the total interior volume of said burner assemblies and a burner heat exchanger with an effective surface area generally equal to the total effective surface area of said burner assemblies.

30. The heating system set forth in claim 15 further including: means for measuring the temperature at the exterior of said enclosure; and means for comparing the exterior temperature with the temperature at the interior of said enclosure and for activating said firing means sequentially and cumulatively according to the difference between the interior and exterior temperatures, one of said firing means being activated when the temperature difference is greater than said second temperature difference and all of said firing means being activated when the temperature difference is greater than said first temperature difference, whereby burner means are activated and de-activated sequentially while maintaining the interior temperature relatively constant and while minimizing the temperature variation in said enclosure due to a variation in the exterior temperature.

31. The heating system set forth in claim 15, wherein the steady state thermal energy produced by all of said burner assemblies when transferred to the interior of said enclosure is generally equal to the heat loss from the interior of said enclosure for a selected first temperature difference between the interior and the exterior of said enclosure, and wherein the steady state thermal energy produced by one of said burner assemblies when transferred to the interior of said enclosure is generally equal to the heat loss from the interior of said enclosure for a selected second temperature difference between the interior and the exterior of said enclosure, said second temperature difference being a fraction of said first temperature difference, whereby the temperature in said enclosure is maintained relatively constant by firing at least one and less than all of said burner assemblies when said temperature difference has a value generally less than said first temperature difference and greater than or equal to said second temperature difference, said steady state condition of said furnace system occuring when startup losses and standby losses are minimized and combustion efficiency is maximized.

* * * * *